United States Patent
Bell et al.

(10) Patent No.: US 7,805,261 B2
(45) Date of Patent: Sep. 28, 2010

(54) METER ELECTRONICS AND METHODS FOR RAPIDLY DETERMINING A MASS FRACTION OF A MULTI-PHASE FLUID FROM A CORIOLIS FLOW METER SIGNAL

(75) Inventors: Mark James Bell, Arvada, CO (US); Craig B. McAnally, Thornton, CO (US)

(73) Assignee: Micro Motion, Inc., Boulder, CO (US)

( * ) Notice: Subject to any disclaimer, the term of this patent is extended or adjusted under 35 U.S.C. 154(b) by 258 days.

(21) Appl. No.: 11/914,810

(22) PCT Filed: May 19, 2006

(86) PCT No.: PCT/US2006/019595

§ 371 (c)(1),
(2), (4) Date: Nov. 19, 2007

(87) PCT Pub. No.: WO2006/127527

PCT Pub. Date: Nov. 30, 2006

(65) Prior Publication Data

US 2008/0184815 A1    Aug. 7, 2008

Related U.S. Application Data

(60) Provisional application No. 60/683,179, filed on May 20, 2005.

(51) Int. Cl.
*G01F 1/00* (2006.01)
*G01F 7/00* (2006.01)
(52) U.S. Cl. .................... 702/45; 73/861.356
(58) Field of Classification Search .............. 702/45, 702/48, 50, 54–56, 137; 73/861.01, 861.04, 73/861.18, 200, 861.356
See application file for complete search history.

(56) References Cited

U.S. PATENT DOCUMENTS 5,535,632 A * 7/1996 Kolpak ................. 73/861.04

(Continued)

FOREIGN PATENT DOCUMENTS

EP        1109016        6/2001

(Continued)

*Primary Examiner*—Hal D Wachsman
*Assistant Examiner*—Mary C O'Malley
(74) *Attorney, Agent, or Firm*—The Ollila Law Group LLC

(57) ABSTRACT

Meter electronics (20) for determining a mass fraction of flow components in a flow material flowing is provided according to an embodiment of the invention. The meter electronics (20) include an interface (201) for receiving a frequency response of the flow material and a processing system (203). The processing system (203) receives the frequency response from the interface (201) and breaks out the frequency response into at least a gas frequency component and a fluid frequency component. The processing system (203) determines an overall density from the frequency response and determines a gas density from the gas frequency component. The processing system (203) determines the void fraction of gas from the frequency response and one or more of the gas frequency component and the fluid frequency component. The processing system (203) determines the mass fraction from the void fraction of gas multiplied by a ratio of the gas density divided by the overall density.

36 Claims, 19 Drawing Sheets

U.S. PATENT DOCUMENTS

| | | | |
|---|---|---|---|
| 5,578,764 A | 11/1996 | Yokoi et al. | |
| 5,594,180 A | 1/1997 | Carpenter et al. | |
| 5,734,112 A | 3/1998 | Bose et al. | |
| 6,318,156 B1 * | 11/2001 | Dutton et al. | 73/61.44 |
| 6,505,131 B1 * | 1/2003 | Henrot | 702/54 |
| 6,505,519 B2 | 1/2003 | Henry et al. | |
| 7,062,976 B2 * | 6/2006 | Gysling et al. | 73/861.18 |
| 7,117,104 B2 * | 10/2006 | Urdaneta et al. | 702/48 |
| 2001/0045134 A1 | 11/2001 | Henry et al. | |
| 2004/0123645 A1 | 7/2004 | Storm et al. | |

FOREIGN PATENT DOCUMENTS

| | | |
|---|---|---|
| JP | 07-181069 | 7/1995 |
| WO | WO2005/059511 A2 | 6/2005 |

* cited by examiner

US 7,805,261 B2

METER ELECTRONICS AND METHODS FOR RAPIDLY DETERMINING A MASS FRACTION OF A MULTI-PHASE FLUID FROM A CORIOLIS FLOW METER SIGNAL

The present application claims the benefit of PCT Patent Application No. PCT/US06/19595, entitled "Meter Electronics and Methods for Determining a Mass Fraction", filed on May 19, 2006, which claims benefit of U.S. Provisional Patent Application No. 60/683,179, entitled "Meter Electronics and Methods for Determining a Mass Fraction", filed on May 20, 2005.

BACKGROUND OF THE INVENTION

1. Field of the Invention

The present invention relates to meter electronics and methods for determining a mass fraction of flow components in a flow material flowing through a flow meter.

2. Statement of the Problem

It is known to use Coriolis mass flow meters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flow meters have one or more flow tubes of different configurations. Each conduit configuration may be viewed as having a set of natural vibration modes including, for example, simple bending, torsional, radial and coupled modes. In a typical Coriolis mass flow measurement application, a conduit configuration is excited in one or more vibration modes as a material flows through the conduit, and motion of the conduit is measured at points spaced along the conduit.

The vibrational modes of the material filled systems are defined in part by the combined mass of the flow tubes and the material within the flow tubes. Material flows into the flow meter from a connected pipeline on the inlet side of the flow meter. The material is then directed through the flow tube or flow tubes and exits the flow meter to a pipeline connected on the outlet side.

A driver applies a force to the flow tube. The force causes the flow tube to oscillate. When there is no material flowing through the flow meter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at different points on the flow tube to produce sinusoidal signals representative of the motion of the flow tube at the different points. The phase difference between the two sensor signals is proportional to the mass flow rate of the material flowing through the flow tube or flow tubes.

One application of a vibrating flow tube device as described above is in measuring a mass flow rate of a flow material. However, in some flow measurement environments, the flow material comprises a multi-phase flow that includes two or more of a fluid phase, a gas phase, and a solid phase. A common multi-phase flow material comprises a fluid flow material that includes entrained gas, such as air, for example.

A prior art flowmeter cannot accurately, quickly, or satisfactorily track or determine a pickoff sensor frequency during a two-phase flow of the flow material. Prior art vibratory flowmeters are designed to measure mass flow rate of a relatively stable and uniform flow material. However, because the flow measurement reflects the mass of the flow material, abrupt changes in mass can cause erroneous measurements or the mass flow changes are not even tracked by the flowmeter. For example, where the flow material includes entrained air, the air bubbles transiting the flowmeter can cause spikes in the frequency response of the flowmeter. These frequency errors can cause difficulty in determining an accurate mass flow rate and can be propagated through any subsequent calculations of other flow characteristics. Consequently, the phase determination is likewise slow and error prone, as the prior art derives the phase difference using the determined pickoff frequency. Therefore, any error in the frequency determination is compounded in the phase determination. The result is increased error in the frequency determination and in the phase determination, leading to increased error in determining the mass flow rate. In addition, because the determined frequency value is used to determine a mass flow rate and a density value (density is approximately equal to one over frequency squared), an error in the frequency determination is repeated or compounded in the mass flow and density determinations.

A prior art approach to metering a flow material does not satisfactorily measure individual components of a multi-phase flow. The prior art frequency determination is relatively slow. The prior art frequency determination typically characterizes the flow over a time period of at least 1-2 seconds and therefore produces an average frequency measurement value. The prior art approach is satisfactory for single phase flows and flows that change only slowly and modestly. Sharp changes are not measurable in the prior art. Accurate measurement of individual flow components cannot be achieved by the prior art. The prior art cannot accurately determine the mass of a multi-phase flow at a point in time. The prior art cannot determine the mass fraction of individual flow components of a multi-phase flow.

SUMMARY OF THE SOLUTION

The above and other problems are solved and an advance in the art is achieved through the provision of meter electronics and methods for determining a mass fraction of flow components in a flow material flowing through a flow meter.

Meter electronics for determining a mass fraction of flow components in a flow material flowing through a flow meter is provided according to an embodiment of the invention. The meter electronics comprises an interface for receiving a frequency response of the flow material and a processing system in communication with the interface. The processing system is configured to receive the frequency response from the interface, and break out the frequency response into at least a gas frequency component and a fluid frequency component. The processing system is further configured to determine an overall density from the frequency response and determine a gas density from the gas frequency component. The processing system is further configured to determine the void fraction of gas from the frequency response and one or more of the gas frequency component and the fluid frequency component. The processing system is further configured to determine the mass fraction from the void fraction of gas multiplied by a ratio of the gas density divided by the overall density.

A method for determining a mass fraction of flow components in a flow material flowing through a flow meter is provided according to an embodiment of the invention. The method comprises receiving a frequency response of the flow material, breaking out the frequency response into at least a gas frequency component and a fluid frequency component, determining an overall density from the frequency response, and determining a gas density from the gas frequency component. The method further comprises determining the void fraction of gas from the frequency response and one or more of the gas frequency component and the fluid frequency component. The method further comprises determining the mass fraction from the void fraction of gas multiplied by a ratio of the gas density divided by the overall density.

A method for determining a mass fraction of flow components in a flow material flowing through a flow meter is provided according to an embodiment of the invention. The method comprises receiving a frequency response of the flow material, processing the frequency response with a notch filter that substantially rejects one of a gas frequency component and a fluid frequency component, determining an overall density from the frequency response, and determining a gas density from the gas frequency component. The method further comprises determining the void fraction of gas from the frequency response and one or more of the gas frequency component and the fluid frequency component. The method further comprises determining the mass fraction from the void fraction of gas multiplied by a ratio of the gas density divided by the overall density.

A method for determining a mass fraction of flow components in a flow material flowing through a flow meter is provided according to an embodiment of the invention. The method comprises receiving a frequency response of the flow material, filtering the frequency response with a first filter that substantially rejects the gas frequency component and substantially passes the fluid frequency component, wherein the first filter outputs the fluid frequency component, and filtering the frequency response with a second filter that substantially rejects the fluid frequency component and substantially passes the gas frequency component, wherein the second filter outputs the gas frequency component. The method further comprises determining an overall density from the frequency response and determining a gas density from the gas frequency component. The method further comprises determining the void fraction of gas from the frequency response and one or more of the gas frequency component and the fluid frequency component. The method further comprises determining the mass fraction from the void fraction of gas multiplied by a ratio of the gas density divided by the overall density.

Aspects of the Invention

In one aspect of the meter electronics, the gas density comprises an inverse of the gas frequency squared and the overall density comprises an inverse of the frequency squared.

In another aspect of the meter electronics, the processing system is further configured to determine a mass flow rate of the flow material from the frequency response and determine at least one of a first flow component mass and a second flow component mass using the mass fraction and the mass flow rate.

In yet another aspect of the meter electronics, the frequency response comprises a first sensor signal and a second sensor signal and the processing system is further configured to determine a substantially instantaneous frequency and determine a substantially instantaneous phase difference, wherein the mass flow rate is determined using the frequency and the phase difference.

In yet another aspect of the meter electronics, the frequency response comprises a first sensor signal and a second sensor signal and the processing system is further configured to determine a substantially instantaneous frequency, determine a substantially instantaneous phase difference, divide the phase difference by the frequency in order to obtain a time delay, and multiply the time delay by a constant in order to obtain the mass flow rate.

In yet another aspect of the meter electronics, the frequency response comprises a first sensor signal and a second sensor signal and the processing system is further configured to generate a first 90 degree phase shift from the first sensor signal, compute the frequency using the first 90 degree phase shift and the first sensor signal, determine a substantially instantaneous phase difference, divide the phase difference by the frequency in order to obtain a time delay, and multiply the time delay by a constant in order to obtain the mass flow rate.

In yet another aspect of the meter electronics, the frequency response comprises a first sensor signal and a second sensor signal and the processing system is further configured to generating a first 90 degree phase shift from the first sensor signal, computing the phase difference using the first 90 degree phase shift, the first sensor signal, and the second sensor signal, determining a substantially instantaneous phase difference, dividing the phase difference by the frequency in order to obtain a time delay, and multiplying the time delay by a constant in order to obtain the mass flow rate.

In yet another aspect of the meter electronics, the frequency response comprises a first sensor signal and a second sensor signal and the processing system is further configured to generating a first 90 degree phase shift from the first sensor signal, generating a second 90 degree phase shift from the second sensor signal, computing the phase difference using the first 90 degree phase shift, the second 90 degree phase shift, the first sensor signal, and the second sensor signal, determining a substantially instantaneous phase difference, dividing the phase difference by the frequency in order to obtain a time delay, and multiplying the time delay by a constant in order to obtain the mass flow rate.

In yet another aspect of the meter electronics, the frequency response comprises a first sensor signal and a second sensor signal and the processing system is further configured to generate a 90 degree phase shift from the first sensor signal, compute a frequency response using the 90 degree phase shift and the first sensor signal, compute a phase difference using at least the 90 degree phase shift, the first sensor signal, and the second sensor signal, compute a time delay using the frequency response and the phase difference, compute the mass flow rate from the time delay, determine a substantially instantaneous phase difference, divide the phase difference by the frequency in order to obtain a time delay, and multiply the time delay by a constant in order to obtain the mass flow rate.

In one aspect of the method, the gas density comprises an inverse of the gas frequency squared and the overall density comprises an inverse of the frequency squared.

In another aspect of the method, the method further comprises determining a mass flow rate of the flow material from the frequency response and determining at least one of a first flow component mass and a second flow component mass using the mass fraction and the mass flow rate.

In yet another aspect of the method, determining the mass flow rate comprises determining a substantially instantaneous frequency and determining a substantially instantaneous phase difference, wherein the mass flow rate is determined using the frequency and the phase difference.

In yet another aspect of the method, the frequency response comprises a first sensor signal and a second sensor signal and determining the mass flow rate comprises determining a substantially instantaneous frequency, determining a substantially instantaneous phase difference, dividing the phase difference by the frequency in order to obtain a time delay, and multiplying the time delay by a constant in order to obtain the mass flow rate.

In yet another aspect of the method, the frequency response comprises a first sensor signal and a second sensor signal and determining the mass flow rate further comprises generating a first 90 degree phase shift from the first sensor signal, computing the frequency using the first 90 degree phase shift and the first sensor signal, determining a substantially instantaneous phase difference, dividing the phase difference by the frequency in order to obtain a time delay, and multiplying the time delay by a constant in order to obtain the mass flow rate.

In yet another aspect of the method, the frequency response comprises a first sensor signal and a second sensor signal and determining the mass flow rate further comprises generating a first 90 degree phase shift from the first sensor signal, computing the phase difference using the first 90 degree phase shift, the first sensor signal, and the second sensor signal, determining a substantially instantaneous phase difference, dividing the phase difference by the frequency in order to obtain a time delay, and multiplying the time delay by a constant in order to obtain the mass flow rate.

In yet another aspect of the method, the frequency response comprises a first sensor signal and a second sensor signal and determining the mass flow rate further comprises generating a first 90 degree phase shift from the first sensor signal, generating a second 90 degree phase shift from the second sensor signal, computing the phase difference using the first 90 degree phase shift, the second 90 degree phase shift, the first sensor signal, and the second sensor signal, determining a substantially instantaneous phase difference, dividing the phase difference by the frequency in order to obtain a time delay, and multiplying the time delay by a constant in order to obtain the mass flow rate.

In yet another aspect of the method, the frequency response comprises a first sensor signal and a second sensor signal and determining the mass flow rate further comprises generating a 90 degree phase shift from the first sensor signal, computing a frequency response using the 90 degree phase shift and the first sensor signal, computing a phase difference using at least the 90 degree phase shift, the first sensor signal, and the second sensor signal, computing a time delay using the frequency response and the phase difference, computing the mass flow rate from the time delay, determining a substantially instantaneous phase difference, dividing the phase difference by the frequency in order to obtain a time delay, and multiplying the time delay by a constant in order to obtain the mass flow rate.

DESCRIPTION OF THE DRAWINGS

The same reference number represents the same element on all drawings.

DETAILED DESCRIPTION OF THE INVENTION

FIGS. 1-20 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
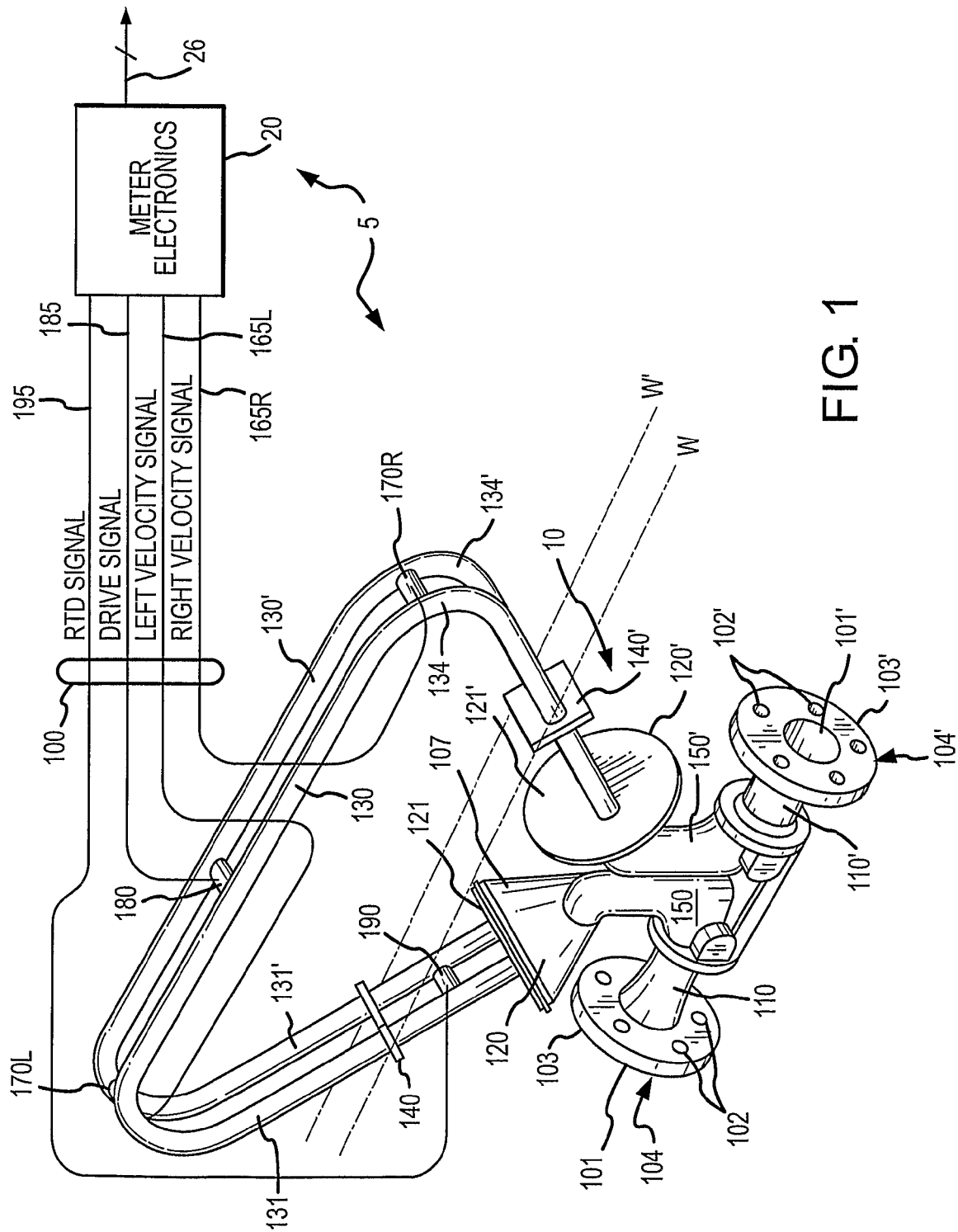
FIG. 1 illustrates a Coriolis flow meter in an example of the invention.

FIG. 1 shows a Coriolis flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present invention. A Coriolis flow meter structure is described although it is apparent to those skilled in the art that the present invention could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of velocity sensors 170L and 170R. Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W-W and W'-W', respectively. These bending axes go through brace bars 140 and 140'. Inasmuch as the Young's modulus of the flow tubes change with temperature, and this change affects the calculation of flow and density, resistive temperature detector (RTD) 190 is mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flow meter. This drive mechanism 180 may comprise any one of many well known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right velocity signals appearing on leads 165L and 165R, respectively. Meter electronics 20 produces the drive signal appearing on lead 185 to drive element 180 and vibrate tubes 130 and 130'. Meter electronics 20 processes the left and right velocity signals and the RTD signal to compute the mass flow rate and the density of the material passing through meter assembly 10. This information, along with other information, is applied by meter electronics 20 over path 26 to utilization means 29.

Figure 2:
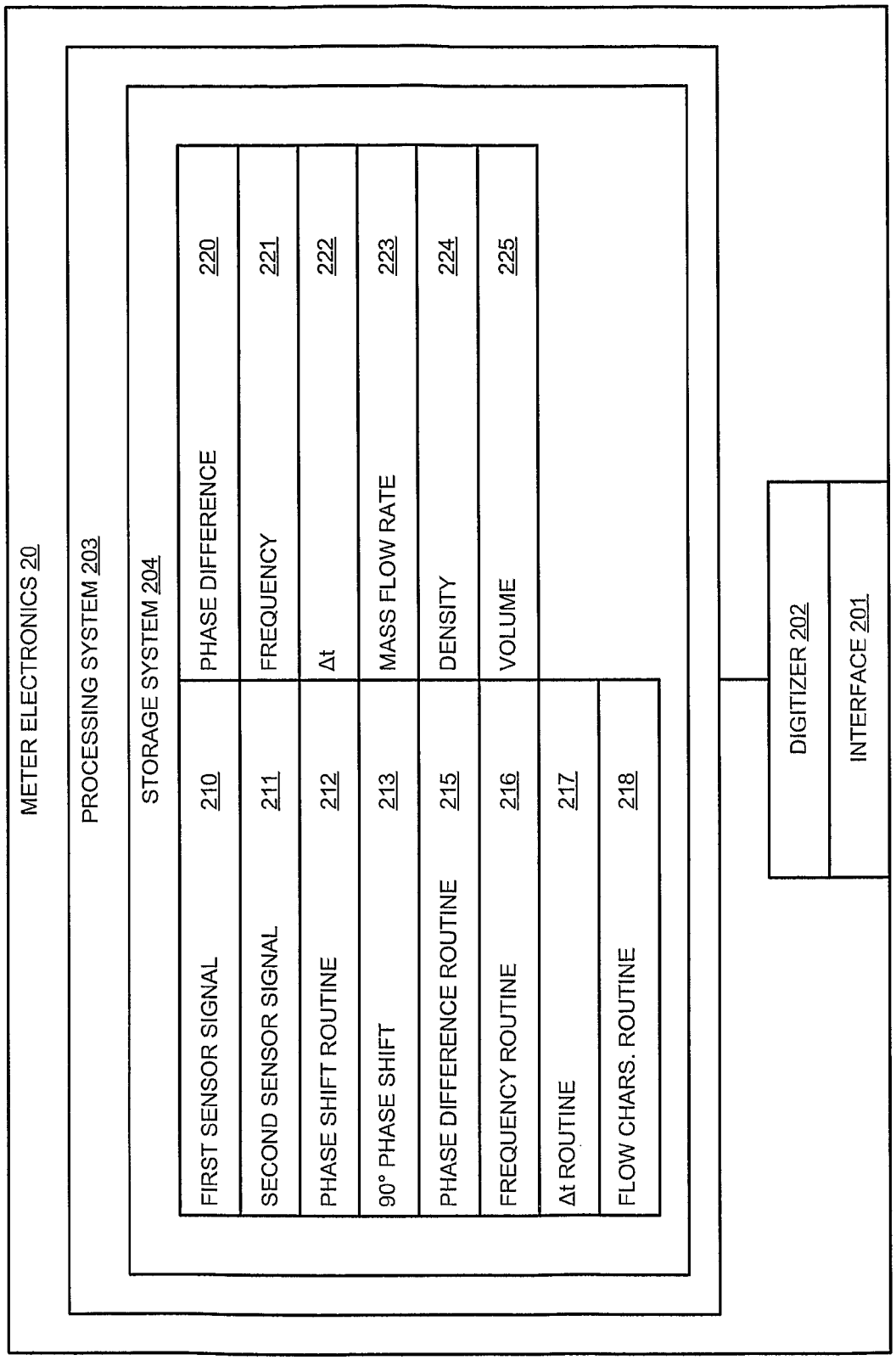
FIG. 2 shows meter electronics according to an embodiment of the invention.

FIG. 2 shows meter electronics 20 according to an embodiment of the invention. The meter electronics 20 can include an interface 201 and a processing system 203. The meter electronics 20 receives first and second sensor signals from the meter assembly 10, such as pickoff/velocity sensor signals.

The meter electronics 20 processes the first and second sensor signals in order to obtain flow characteristics of the flow material flowing through the meter assembly 10. For example, the meter electronics 20 can determine one or more of a phase difference, a frequency, a time difference ($\Delta t$), a density, a mass flow rate, and a volume flow rate from the sensor signals, for example. In addition, other flow characteristics can be determined according to the invention. The determinations are discussed below.

The phase difference determination and the frequency determination are much faster and more accurate and reliable than such determinations in the prior art. In one embodiment, the phase difference determination and the frequency determination are directly derived from a phase shift of only one sensor signal, without the need for any frequency reference signal. This advantageously reduces the processing time required in order to compute the flow characteristics. In another embodiment, the phase difference is derived from phase shifts of both sensor signals, while the frequency is derived from only one phase shift signal. This increases the accuracy of both flow characteristics, and both can be determined much faster than in the prior art.

The prior art frequency determination methods typically take 1-2 seconds to perform. In contrast, the frequency determination according to the invention can be performed in as little as 50 milliseconds (ms). Even faster frequency determination is contemplated, depending on the type and configuration of the processing system, the sampling rate of the vibrational response, the filter sizes, the decimation rates, etc. At the 50 ms frequency determination rate, the meter electronics 20 according to the invention can be about 40 times faster than the prior art.

The interface 201 receives the sensor signal from one of the velocity sensors 170L and 170R via the leads 100 of FIG. 1. The interface 201 can perform any necessary or desired signal conditioning, such as any manner of formatting, amplification, buffering, etc. Alternatively, some or all of the signal conditioning can be performed in the processing system 203.

In addition, the interface 201 can enable communications between the meter electronics 20 and external devices. The interface 201 can be capable of any manner of electronic, optical, or wireless communication.

The interface 201 in one embodiment is coupled with a digitizer 202, wherein the sensor signal comprises an analog sensor signal. The digitizer 202 samples and digitizes the analog sensor signal and produces a digital sensor signal. The digitizer 202 can also perform any needed decimation, wherein the digital sensor signal is decimated in order to reduce the amount of signal processing needed and to reduce the processing time. The decimation will be discussed in more detail below.

The processing system 203 conducts operations of the meter electronics 20 and processes flow measurements from the flow meter assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

The processing system 203 processes the sensor signal 210 in order to determine one or more flow characteristics from the sensor signal 210. The one or more flow characteristics can include a phase difference, a frequency, a time difference (Δt), a mass flow rate, and/or a density for the flow material, for example.

In the embodiment shown, the processing system 203 determines the flow characteristics from the two sensor signals 210 and 211 and the single sensor signal phase shift 213. The processing system 203 can determine at least the phase difference and the frequency from the two sensor signals 210 and 211 and the single phase shift 213. As a result, either a first or second phase shifted sensor signal (such as one of the upstream or downstream pickoff signals) can be processed by the processing system 203 according to the invention in order to determine a phase difference, a frequency, a time difference (Δt), and/or a mass flow rate for the flow material.

The storage system 204 can store flow meter parameters and data, software routines, constant values, and variable values. In one embodiment, the storage system 204 includes routines that are executed by the processing system 203. In one embodiment, the storage system 204 stores a phase shift routine 212, a phase difference routine 215, a frequency routine 216, a time difference (Δt) routine 217, and a flow characteristics routine 218.

In one embodiment, the storage system 204 stores variables used to operate the Coriolis flow meter 5. The storage system 204 in one embodiment stores variables such as the first sensor signal 210 and the second sensor signal 211, which are received from the velocity/pickoff sensors 170L and 170R. In addition, the storage system 204 can store a 90 degree phase shift 213 that is generated in order to determine the flow characteristics.

In one embodiment, the storage system 204 stores one or more flow characteristics obtained from the flow measurements. The storage system 204 in one embodiment stores flow characteristics such as a phase difference 220, a frequency 221, a time difference (Δt) 222, a mass flow rate 223, a density 224, and a volume flow rate 225, all determined from the sensor signal 210.

The phase shift routine 212 performs a 90 degree phase shift on an input signal, i.e., on the sensor signal 210. The phase shift routine 212 in one embodiment implements a Hilbert transform (discussed below).

The phase difference routine 215 determines a phase difference using the single 90 degree phase shift 213. Additional information can also be used in order to compute the phase difference. The phase difference in one embodiment is computed from the first sensor signal 210, the second sensor signal 211, and the 90 degree phase shift 213. The determined phase difference can be stored in the phase difference 220 of the storage system 204. The phase difference, when determined from the 90 phase shift 213, can be calculated and obtained much faster than in the prior art. This can provide a critical difference in flow meter applications having high flow rates or where multi-phase flows occur. In addition, the phase difference can be determined independent of the frequency of either sensor signal 210 or 211. Moreover, because the phase difference is determined independently of the frequency, an error component in the phase difference does not include an error component of the frequency determination, i.e., there is no compounding error in the phase difference measurement. Consequently, the phase difference error is reduced over a phase difference of the prior art.

The frequency routine 216 determines a frequency (such as that exhibited by either the first sensor signal 210 or the second sensor signal 211) from the 90 degree phase shift 213. The determined frequency can be stored in the frequency 221 of the storage system 204. The frequency, when determined from the single 90 phase shift 213, can be calculated and obtained much faster than in the prior art. This can provide a critical difference in flow meter applications having high flow rates or where multi-phase flows occur.

The time difference (Δt) routine 217 determines a time difference (Δt) between the first sensor signal 210 and the second sensor signal 211. The time difference (Δt) can be stored in the time difference (Δt) 222 of the storage system 204. The time difference (Δt) comprises substantially the determined phase divided by the determined frequency, and is therefore used to determine the mass flow rate.

The flow characteristics routine 218 can determine one or more flow characteristics. The flow characteristics routine 218 can use the determined phase difference 220 and the determined frequency 221, for example, in order to accomplish these additional flow characteristics. It should be understood that additional information may be required for these determinations, such as the mass flow rate or density, for example. The flow characteristics routine 218 can determine a mass flow rate from the time difference (Δt) 222, and therefore from the phase difference 220 and the frequency 221. The formula for determining mass flow rate is given in U.S. Pat. No. 5,027,662 to Titlow et al., and is incorporated herein by reference. The mass flow rate is related to the mass flow of flow material in the meter assembly 10. Likewise, the flow characteristics routine 218 can also determine the density 224 and/or the volume flow rate 225. The determined mass flow rate, density, and volume flow rate can be stored in the mass flow rate 223, the density 224, and the volume 225 of the storage system 204, respectively. In addition, the flow characteristics can be transmitted to external devices by the meter electronics 20.

Figure 3:
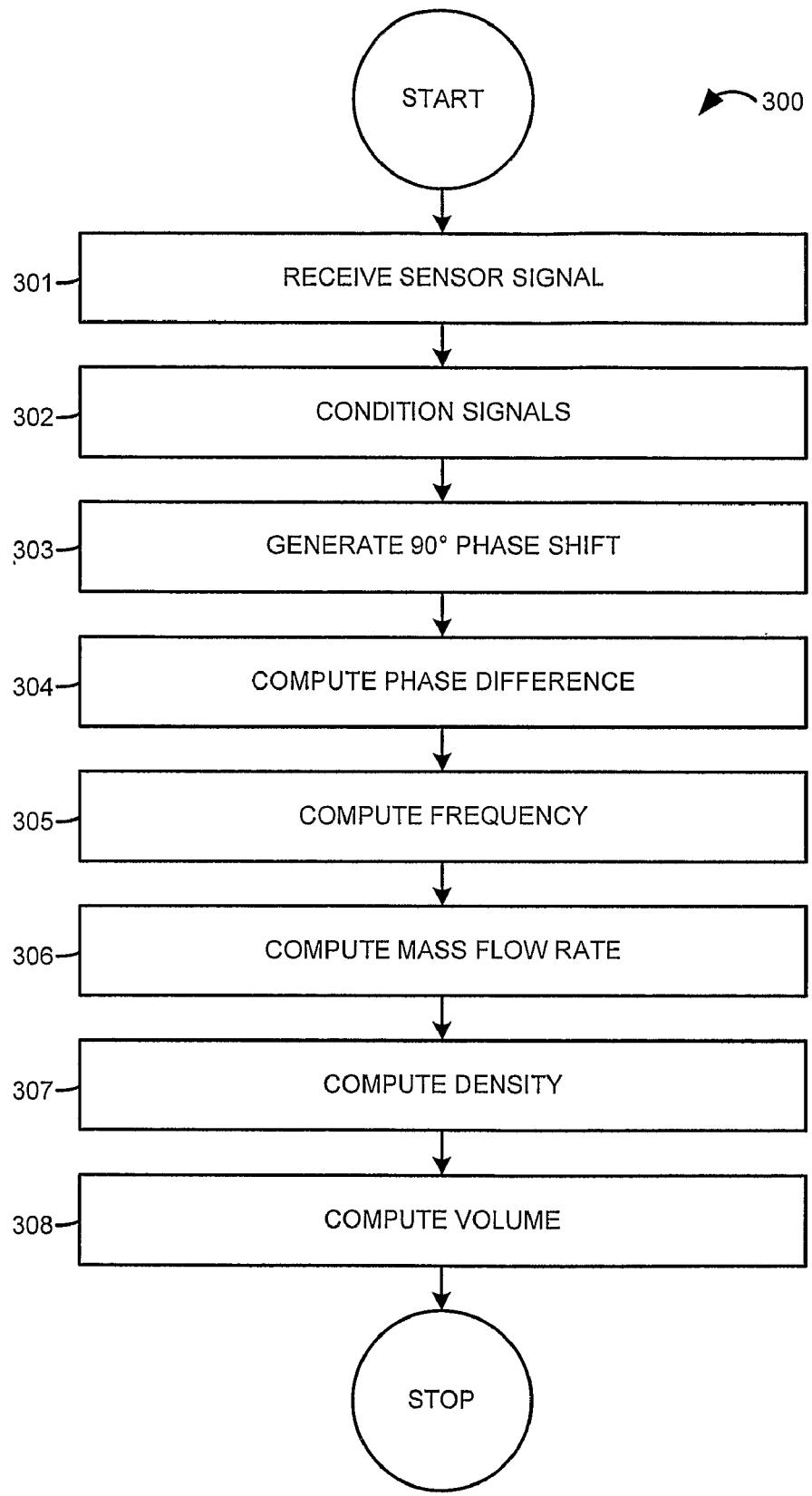
FIG. 3 is a flowchart of a method of processing a sensor signal in a Coriolis flowmeter according to an embodiment of the invention.

FIG. 3 is a flowchart 300 of a method of processing sensor signals in a Coriolis flowmeter according to an embodiment of the invention. In step 301, the first and second sensor signals are received. The first sensor signal can comprise either an upstream or downstream pickoff sensor signal.

In step 302, the sensor signals can be conditioned. In one embodiment, the conditioning can include filtering to remove noise and unwanted signals. In one embodiment, the filtering can comprise band-pass filtering centered around the expected fundamental frequency of the Coriolis flow meter 5. In addition, other conditioning operations can be performed, such as amplification, buffering, etc. If the sensor signals comprise analog signals, the step can further comprise any manner of sampling, digitization, and decimation that are performed in order to produce digital sensor signals.

In step 303, a single 90 degree phase shift is generated. The 90 degree phase shift comprises a 90 degree phase shift of the sensor signal. The 90 degree phase shift can be performed by any manner of phase shift mechanism or operation. In one embodiment, the 90 degree phase shift is performed using a Hilbert transform, operating on digital sensor signals.

In step 304, a phase difference is computed, using the single 90 degree phase shift. Additional information can also be used in order to compute the phase difference. In one embodiment, the phase difference is determined from the first sensor signal, the second sensor signal, and the single 90 degree phase shift. The phase difference comprises a phase difference in the response signal, i.e., in a pickoff sensor, that is seen due to the Coriolis effect in the vibrating meter assembly 10.

The resulting phase difference is determined without the need for any frequency value in the calculation. The resulting phase difference can be obtained much faster than a phase difference calculated using a frequency. The resulting phase difference has a greater accuracy than a phase difference calculated using a frequency.

In step 305, a frequency is computed. The frequency according to the invention is advantageously computed from the 90 degree phase shift. The frequency in one embodiment uses the 90 degree phase shift and the corresponding sensor signal from which the 90 degree phase shift is derived. The frequency is a vibrational response frequency of one of the first sensor signal and the second sensor signal (the frequencies of the two sensor signals are substantially identical in operation). The frequency comprises a vibrational frequency response of the flowtube or flowtubes to a vibration generated by the driver 180.

The frequency thus derived is obtained without the need for any independent frequency reference signal. The frequency is obtained from the single 90 degree phase shift in an operation that is much faster than in the prior art. The resulting frequency has a greater accuracy than a frequency calculated in the prior art.

In step 306, a mass flow rate of flow material is computed. The mass flow rate is computed from the resulting phase difference and the resulting frequency computed in steps 304 and 305. In addition, the mass flow rate computation can compute a time difference ($\Delta t$) from the phase difference and the frequency, with the time difference ($\Delta t$) being ultimately used to compute the mass flow rate.

In step 307, the density can optionally be determined. The density can be determined as one of the flow characteristics, and can be determined from the frequency, for example.

In step 308, the volume flow rate can optionally be determined. The volume flow rate can be determined as one of the flow characteristics, and can be determined from the mass flow rate and the density, for example.

Figure 4:
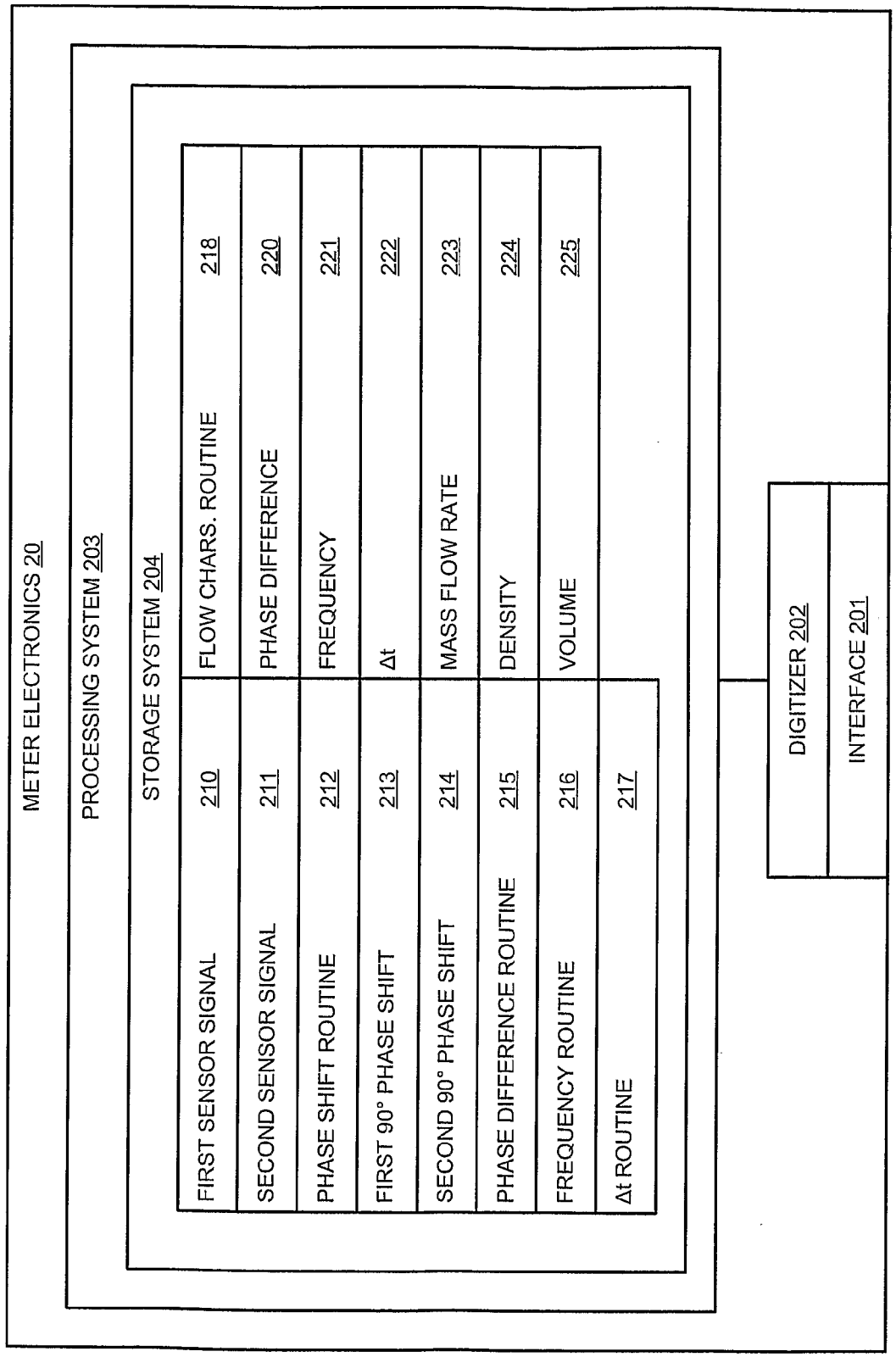
FIG. 4 shows the meter electronics according to an embodiment of the invention.

FIG. 4 shows the meter electronics 20 according to an embodiment of the invention. The elements in common with FIG. 2 share the same reference numbers.

The meter electronics 20 in this embodiment includes the first sensor signal 210 and the second sensor signal 211. The processing system 203 processes the first and second (digital) sensor signals 210 and 211 in order to determine one or more flow characteristics from the signals. As previously discussed, the one or more flow characteristics can include a phase difference, a frequency, a time difference ($\Delta t$), a mass flow rate, a density, and/or a volume flow rate for the flow material.

In the embodiment shown, the processing system 203 determines the flow characteristics from only the two sensor signals 210 and 211, without the need for any external frequency measurement and without the need for an external frequency reference signal. The processing system 203 can determine at least the phase difference and the frequency from the two sensor signals 210 and 211.

As was previously discussed, the storage system 204 stores a phase shift routine 212, a phase difference routine 215, a frequency routine 216, a time difference ($\Delta t$) routine 217, and a flow characteristics routine 218. The storage system 204 stores the first sensor signal 210 and the second sensor signal 211. The storage system 204 also stores a first 90 degree phase shift 213 and a second 90 degree phase shift that are generated from the sensor signals in order to determine the flow characteristics. As was previously discussed, the storage system 204 stores the phase difference 220, the frequency 221, the time difference ($\Delta t$) 222, the mass flow rate 223, the density 224, and the volume flow rate 225.

The phase shift routine 212 performs a 90 degree phase shift on an input signal, including on the first sensor signal 210 and on the second sensor signal 211. The phase shift routine 212 in one embodiment implements a Hilbert transform (discussed below).

The phase difference routine 215 determines a phase difference using the first 90 degree phase shift 213 and the second 90 degree phase shift 214. Additional information can also be used in order to compute the phase difference. The phase difference in one embodiment is computed from the first sensor signal 210, the second sensor signal 211, the first 90 degree phase shift 212, and the second 90 degree phase shift 213. The determined phase difference can be stored in the phase difference 220 of the storage system 204, as previously discussed. The phase difference, when determined using the first and second 90 phase shifts, can be calculated and obtained much faster than in the prior art. This can provide a critical difference in flow meter applications having high flow rates or where multi-phase flows occur. In addition, the phase difference can be determined independent of the frequency of the sensor signals 210 and 211. Moreover, because the phase difference is determined independently of the frequency, an error component in the phase difference does not suffer from an error component of the frequency determination, i.e., there is no compounding error in the phase difference measurement. Consequently, the phase difference error is reduced over a phase difference of the prior art.

The frequency routine 216 determines a frequency (such as that exhibited by either the first sensor signal 210 or the second sensor signal 211) from the first 90 degree phase shift 213 and the second 90 degree phase shift 214. The determined frequency can be stored in the frequency 221 of the storage system 204, as previously discussed. The frequency, when determined from the first and second 90 phase shifts, can be calculated and obtained much faster than in the prior art. This can provide a critical difference in flow meter applications having high flow rates or where multi-phase flows occur.

The time difference ($\Delta t$) routine 217 determines a time difference ($\Delta t$) between the first sensor signal 210 and the second sensor signal 211. The time difference ($\Delta t$) can be stored in the time difference ($\Delta t$) 222 of the storage system 204, as previously discussed. The time difference ($\Delta t$) comprises substantially the determined phase divided by the determined frequency, and is therefore used to determine the mass flow rate.

The flow characteristics routine 218 can determine one or more of the mass flow rate, the density, and/or the volume flow rate, as previously discussed.

Figure 5:
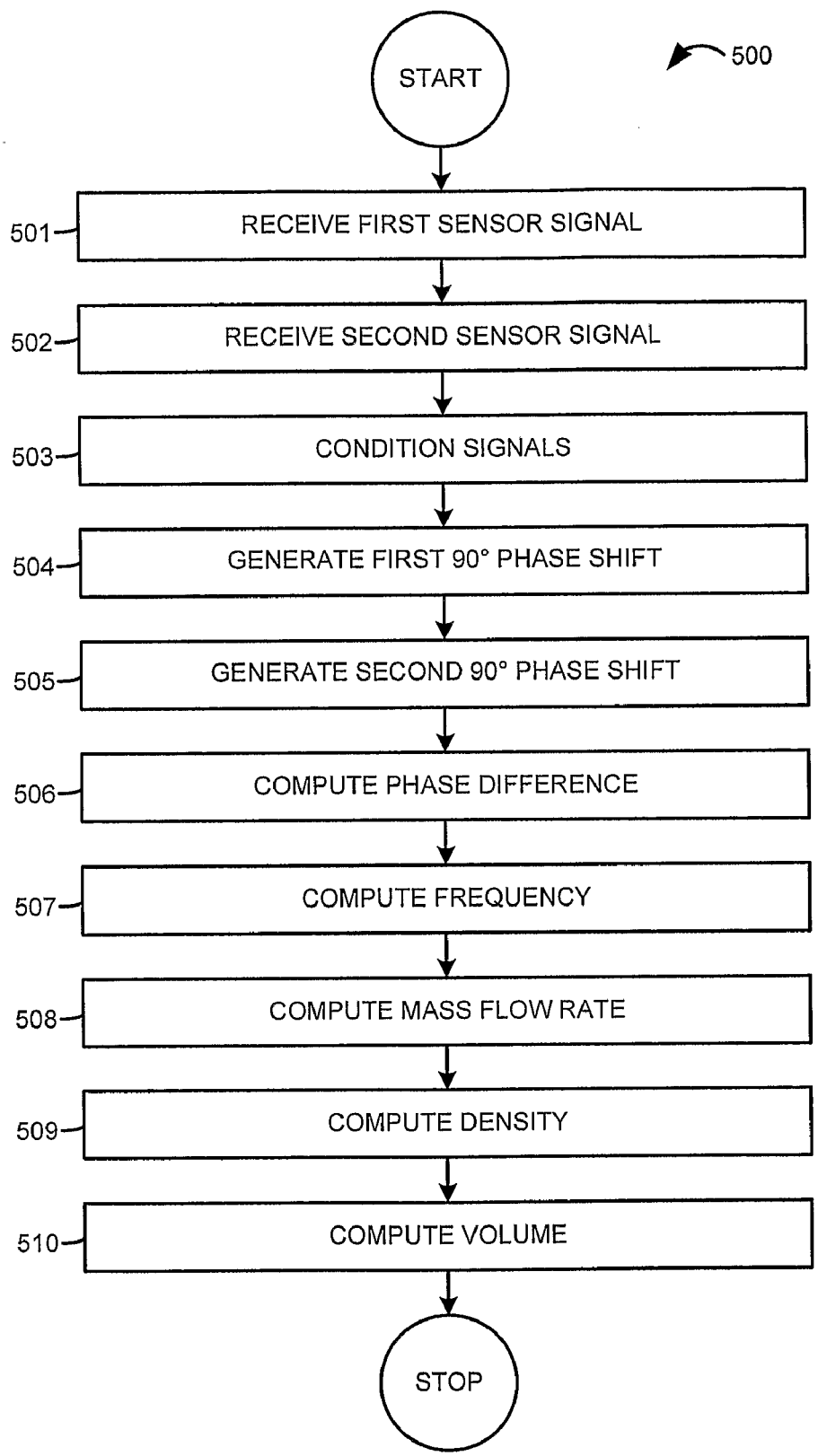
FIG. 5 is a flowchart of a method of processing first and second sensor signals in a Coriolis flowmeter according to an embodiment of the invention.

FIG. 5 is a flowchart 500 of a method of processing first and second sensor signals in a Coriolis flowmeter according to an embodiment of the invention. In step 501, the first sensor signal is received. In one embodiment, the first sensor signal comprises either an upstream or downstream pickoff sensor signal.

In step 502, the second sensor signal is received. In one embodiment, the second sensor signal comprises either a downstream or upstream pickoff sensor signal (i.e., the opposite of the first sensor signal).

In step 503, the sensor signals can be conditioned. In one embodiment, the conditioning can include filtering to remove noise and unwanted signals. In one embodiment, the filtering can comprise band-pass filtering, as previously discussed. In addition, other conditioning operations can be performed, such as amplification, buffering, etc. If the sensor signals comprise analog signals, the step can further comprise any manner of sampling, digitization, and decimation that are performed in order to produce digital sensor signals.

In step 504, a first 90 degree phase shift is generated. The first 90 degree phase shift comprises a 90 degree phase shift of the first sensor signal. The 90 degree phase shift can be performed by any manner of mechanism or operation. In one embodiment, the 90 degree phase shift is performed using a Hilbert transform, operating on digital sensor signals.

In step 505, a second 90 degree phase shift is generated. The second 90 degree phase shift comprises a 90 degree phase shift of the second sensor signal. As in the first 90 degree phase shift, the 90 degree phase shift can be performed by any manner of mechanism or operation.

In step 506, a phase difference is computed between the first sensor signal and the second sensor signal, using the first 90 degree phase shift and the second 90 degree phase shift. Additional information can also be used in order to compute the phase difference. In one embodiment, the phase difference is determined from the first sensor signal, the second sensor signal, the first 90 degree phase shift, and the second 90 degree phase shift. The phase difference comprises a phase difference in the response signal, i.e., in the two pickoff sensors, that is seen due to the Coriolis effect in the vibrating meter assembly 10.

The resulting phase difference is determined without the need for any frequency value in the calculation. The resulting phase difference can be obtained much faster than a phase difference calculated using a frequency. The resulting phase difference has a greater accuracy than a phase difference calculated using a frequency.

In step 507, a frequency is computed. The frequency according to the invention is advantageously computed from the first 90 degree phase shift and the second 90 degree phase shift. The frequency in one embodiment uses the 90 degree phase shift and the corresponding sensor signal from which the 90 degree phase shift is derived. The frequency is a vibrational response frequency of one of the first sensor signal and the second sensor signal (the frequencies of the two sensor signals are substantially identical in operation). The frequency comprises a vibrational frequency response of the flowtube or flowtubes to a vibration generated by the driver 180.

The frequency thus derived is obtained without the need for any independent frequency reference signal. The frequency is obtained from the 90 degree phase shifts in an operation that is much faster than in the prior art. The resulting frequency has a greater accuracy than a frequency calculated in the prior art.

In step 508, a mass flow rate of flow material is computed. The mass flow rate is computed from the resulting phase difference and the resulting frequency computed in steps 506 and 507. In addition, the mass flow rate computation can compute a time difference ($\Delta t$) from the phase difference and the frequency, with the time difference ($\Delta t$) being ultimately used to compute the mass flow rate.

In step 509, the density can optionally be determined, as previously discussed.

In step 510, the volume flow rate can optionally be determined, as previously discussed.

Figure 6:
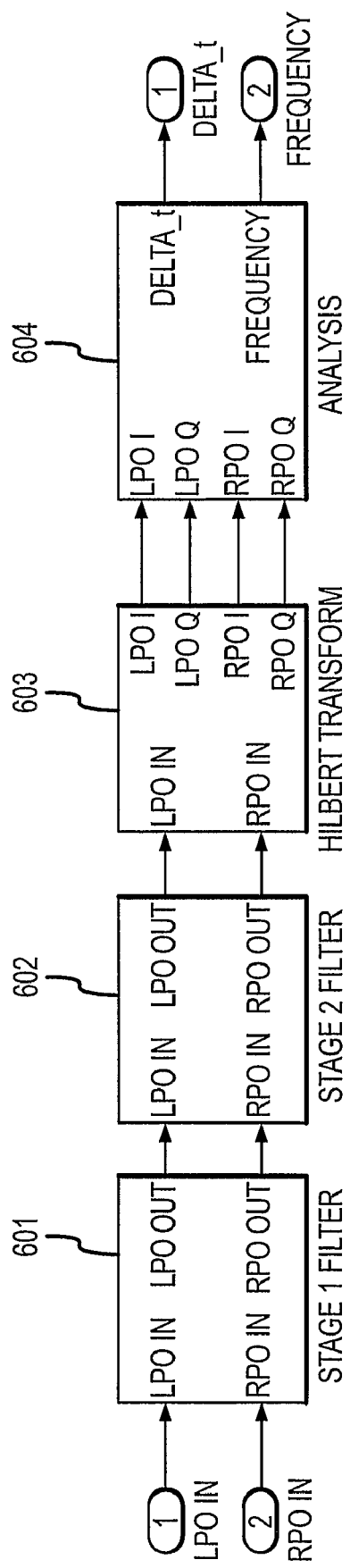
FIG. 6 is a block diagram of a portion of the processing system according to an embodiment of the invention.

FIG. 6 is a block diagram 600 of a portion of the processing system 203 according to an embodiment of the invention. In the figure, the blocks represent either processing circuitry or processing actions/routines. The block diagram 600 includes a stage 1 filter block 601, a stage 2 filter block 602, a Hilbert transform block 603, and an analysis block 604. The LPO and RPO inputs comprise the left pickoff signal input and the right pickoff signal input. Either the LPO or the RPO can comprise a first sensor signal.

In one embodiment, the stage 1 filter block 601 and the stage 2 filter block 602 comprise digital Finite Impulse Response (FIR) polyphase decimation filters, implemented in the processing system 203. These filters provide an optimal method for filtering and decimating one or both sensor signals, with the filtering and decimating being performed at the same chronological time and at the same decimation rate. Alternatively, the stage 1 filter block 601 and the stage 2 filter block 602 can comprise Infinite Impulse Response (IIR) filters or other suitable digital filters or filter processes. However, it should be understood that other filtering processes and/or filtering embodiments are contemplated and are within the scope of the description and claims.

Figure 7:
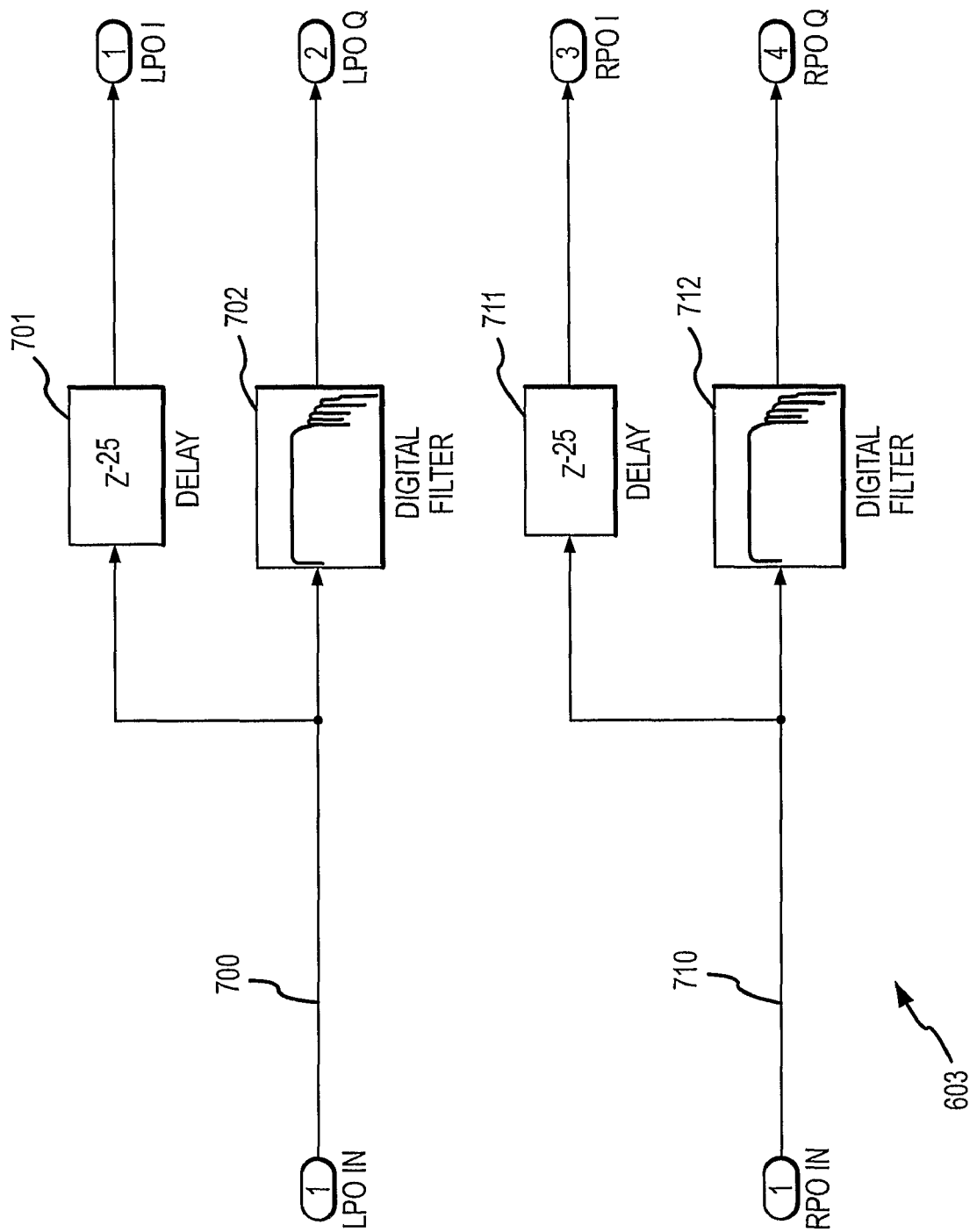
FIG. 7 shows detail of the Hilbert transform block according to an embodiment of the invention.

FIG. 7 shows detail of the Hilbert transform block 603 according to an embodiment of the invention. In the embodiment shown, the Hilbert transform block 603 includes a LPO branch 700 and a RPO branch 710. The LPO branch 700 includes a LPO delay block 701 in parallel with a LPO filter block 702. Likewise, the RPO branch includes an RPO delay block 711 in parallel with an RPO filter block 712. The LPO delay block 701 and the RPO delay block 711 introduce sampling delays. The LPO delay block 701 and the RPO delay block 711 therefore select LPO and RPO digital signal samples that are chronologically later in time that the LPO and RPO digital signal samples that are filtered by the LPO filter block 702 and the RPO filter block 712. The LPO filter block 702 and the RPO filter block 712 perform a 90 degree phase shift on the inputted digital signal samples.

The Hilbert transform block 603 is a first step to providing the phase measurement. The Hilbert transform block 603 receives the filtered, decimated LPO and RPO signals and performs a Hilbert transform. The Hilbert transform produces 90 degree phase-shifted versions of the LPO and RPO signals, i.e., it produces quadrature (Q) components of the original, in-phase (I) signal components. The output of the Hilbert transform block 603 therefore provides the new quadrature (Q) components LPO Q and RPO Q, along with the original, in-phase (I) signal components LPO I and RPO I.

The inputs to the Hilbert transform block 603 can be represented as:

$$LPO = A_{lpo} \cos(\omega t) \qquad (2)$$

$$RPO = A_{rpo} \cos(\omega t + \phi) \qquad (3)$$

Using the Hilbert transform the output becomes:

$$LPO_{hilbert} = A_{lpo} \sin(\omega t) \qquad (4)$$

$$RPO_{hilbert} = A_{rpo} \sin(\omega t + \phi)] \qquad (5)$$

Combining the original terms with the output of the Hilbert transform yields:

$$LPO = A_{lpo}[\cos(\omega t) + i \sin(\omega t)] = A_{lpo} e^{j(\omega t)} \qquad (6)$$

$$RPO = A_{rpo}[\cos(\omega t + \phi) + i \sin(\omega t + \phi)] = A_{rpo} e^{j(\omega t + \phi)} \qquad (7)$$

Figure 8:
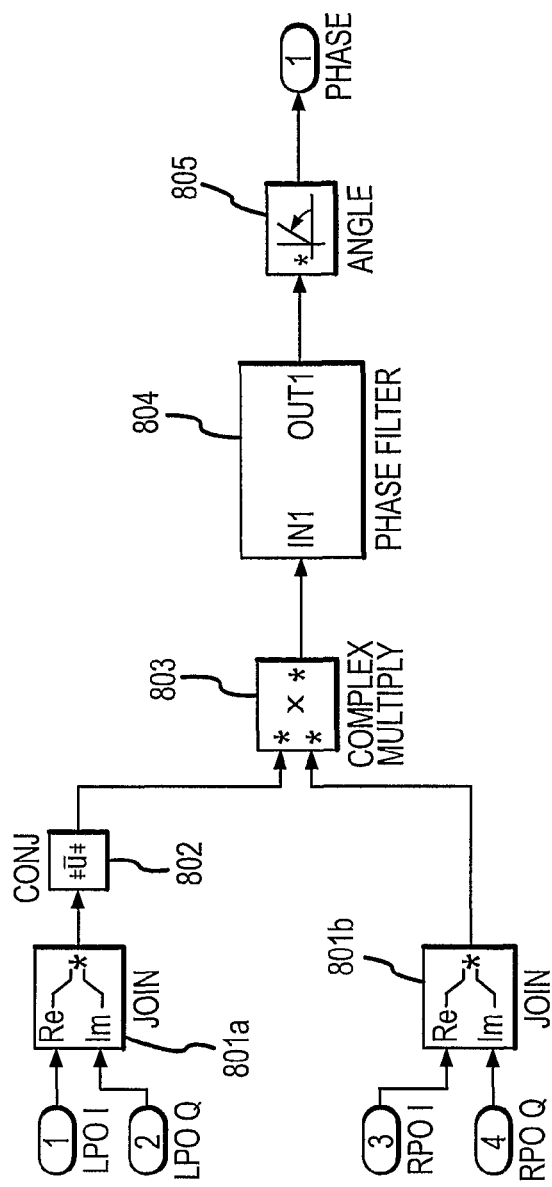
FIGS. 8 and 9 are block diagrams of two independent branches of the analysis block according to an embodiment of the invention.
Figure 9:
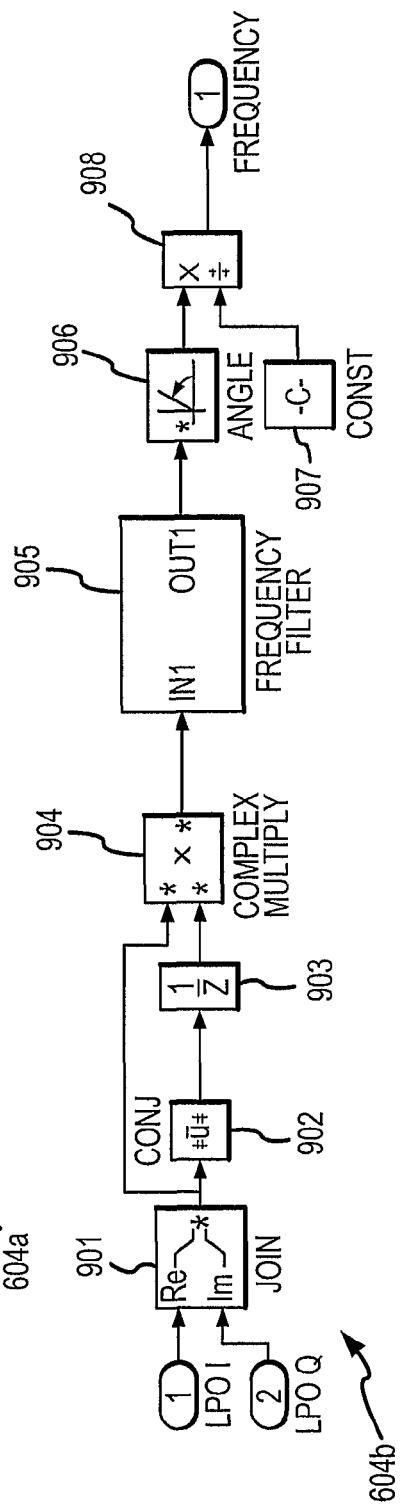

FIGS. 8 and 9 are block diagrams of two independent branches of the analysis block 604 according to an embodiment of the invention. The analysis block 604 is the final stage of the frequency, differential phase, and delta T ($\Delta t$) measurement. FIG. 8 is phase portion 604a comprising a first branch that determines a phase difference from the in-phase (I) and quadrature (Q) components. FIG. 9 is a frequency portion 604b that determines a frequency from the in-phase (I) and quadrature (Q) components of a single sensor signal. The single sensor signal can comprise the LPO signal, as shown, or can alternatively comprise the RPO signal.

In the embodiment of FIG. 8, the phase portion 604a of the analysis block 604 includes join blocks 801a and 801b, a conjugate block 802, a complex multiplication block 803, a filter block 804, and a phase angle block 805.

The join blocks 801a and 801b receive both in-phase (I) and quadrature (Q) components of a sensor signal and pass them on. The conjugate block 802 performs a complex conjugate on a sensor signal (here the LPO signal), and forms a negative of the imaginary signal. The complex multiplication block 803 multiplies the RPO signal and the LPO signal, implementing equation (8) below. The filter block 804 implements a digital filter, such as the FIR filter discussed above. The filter block 804 can comprise a polyphase decimation filter that is used to remove harmonic content from the in-phase (I) and quadrature (Q) components of the sensor signal, as well as to decimate the signal. The filter coefficients can be chosen to provide decimation of the inputted signal, such as decimation by a factor of 10, for example. The phase angle block 805 determines the phase angle from the in-phase (I) and quadrature (Q) components of the LPO signal and the RPO signal. The phase angle block 805 implements equation (11) shown below.

The phase portion 604a shown in FIG. 8 implements the following equation:

$$\overline{LPO} \times RPO = A_{lpo} e^{-j(\omega t)} \times A_{Rpo} e^{j(\omega t + \phi)} = A_{lpo} \times A_{Rpo} e^{j(-\omega t + \omega t + \phi)} \quad (8)$$

where $\overline{LPO}$ is the complex conjugate of LPO. Assuming that:

$$A_{Rpo} = A_{Lpo} = A \quad (9)$$

then:

$$\overline{LPO} \times RPO = A^2 e^{j(\phi)} = A^2 [\cos(\phi) + i \sin(\phi)] \quad (10)$$

The resulting differential phase angle is:

$$\phi = \tan^{-1}\left[\frac{\sin(\phi)}{\cos(\phi)}\right] \quad (11)$$

FIG. 9 is a block diagram of a frequency portion 604b of the analysis block 604 according to the invention. The frequency portion 604b can operate on either the left or right pickoff signal (LPO or RPO). The frequency portion 604b in the embodiment shown includes a join block 901, a complex conjugate block 902, a sampling block 903, a complex multiplication block 904, a filter block 905, a phase angle block 906, a constant block 907, and a division block 908.

As previously discussed, the join block 901 receives both in-phase (I) and quadrature (Q) components of a sensor signal and passes them on. The conjugate block 902 performs a complex conjugate on a sensor signal, here the LPO signal, and forms a negative of the imaginary signal. The delay block 903 introduces a sampling delay into the frequency portion 604b, and therefore selects a digital signal sample that is chronologically older in time. This older digital signal sample is multiplied with the current digital signal in the complex multiplication block 904. The complex multiplication block 904 multiplies the LPO signal and the LPO conjugate signal, implementing equation (12) below. The filter block 905 implements a digital filter, such as the FIR filter previously discussed. The filter block 905 can comprise a polyphase decimation filter that is used to remove harmonic content from the in-phase (I) and quadrature (Q) components of the sensor signal, as well as to decimate the signal. The filter coefficients can be chosen to provide decimation of the inputted signal, such as decimation by a factor of 10, for example. The phase angle block 906 determines a phase angle from the in-phase (I) and quadrature (Q) components of the LPO signal. The phase angle block 906 implements a portion of equation (13) below. The constant block 907 supplies a factor comprising a sample rate $F_s$ divided by two pi, as shown in equation (14). The division block 908 performs the division operation of equation (14).

The frequency portion 604b implements the following equation:

$$\overline{LPO}_{(n-1)} \times LPO_{(n)} = A_{lpo} e^{-j(\omega t_{-1})} \times A_{Lpo} e^{j(\omega t)} = A^2_{lpo} e^{j(\omega t - \omega t_{-1})} \quad (12)$$

The angle between two consecutive samples is therefore:

$$\omega t - \omega t_{-1} = \tan^{-1}\left[\frac{\sin(\omega t - \omega t_{-1})}{\cos(\omega t - \omega t_{-1})}\right] \quad (13)$$

which is the radian frequency of the left pick-off. Converting to Hz:

$$f_{lpo} = \frac{(\omega t - \omega t_{-1}) \times Fs}{2\pi} \quad (14)$$

where "Fs" is the rate of the Hilbert transform block 603. In the example previously discussed, "Fs" is about 2 kHz.

Figure 10:
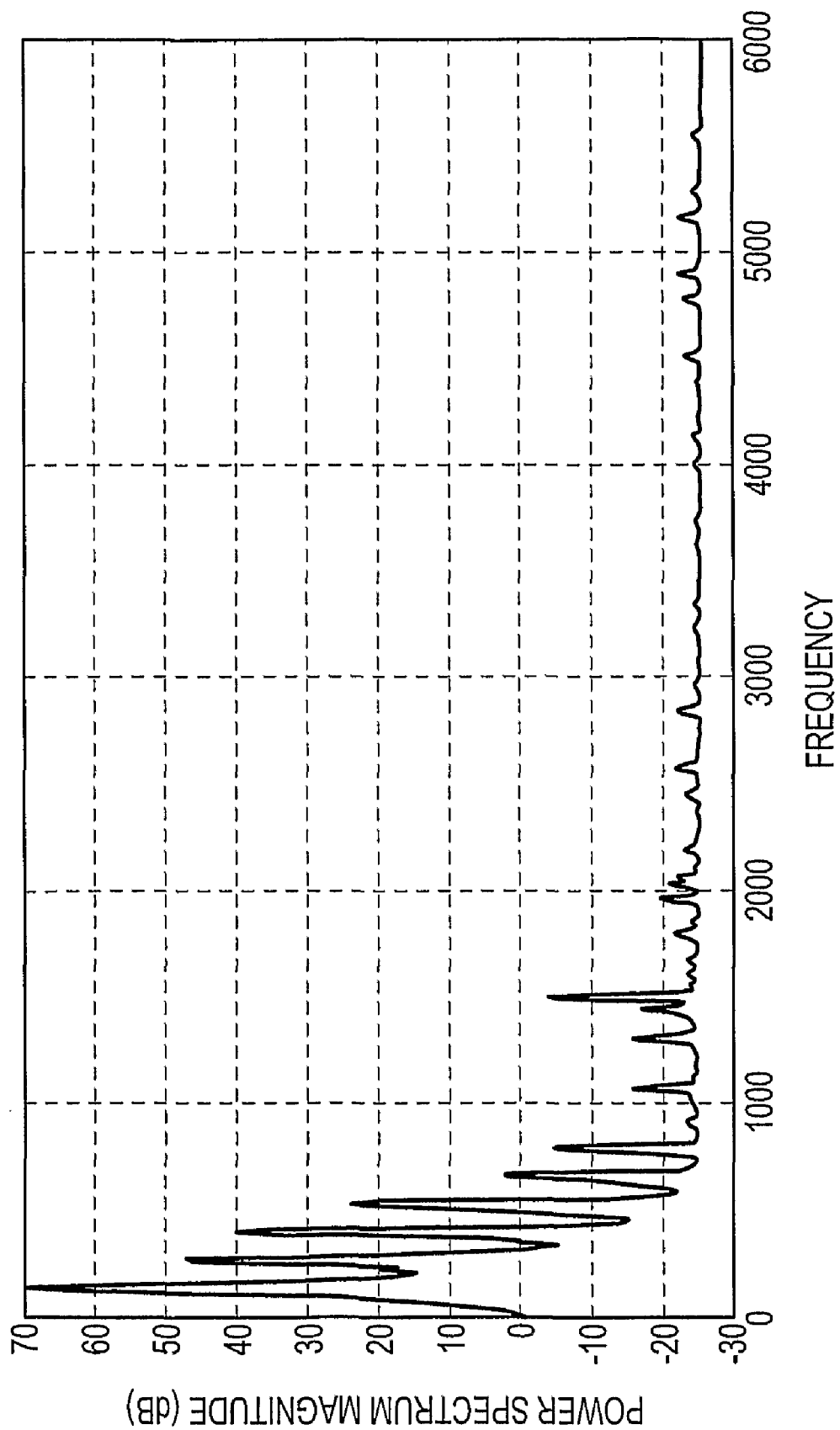
FIG. 10 is a power spectrum density plot of a pick-off sensor signal of a flow meter under normal conditions.

FIG. 10 is a power spectrum density plot of a pick-off sensor signal of a flow meter under normal conditions. The fundamental frequency of the flowmeter is the tallest spike of the graph and is located at about 135 Hz. The figure also shows several other large spikes in the frequency spectrum (the first non-fundamental mode is the twist mode at a frequency of about 1.5 times the frequency of the fundamental mode). These spikes comprise harmonic frequencies of the flowmeter and also comprise other, undesirable sensor modes (i.e., a twist mode, a second bend mode, etc.).

Figure 11:
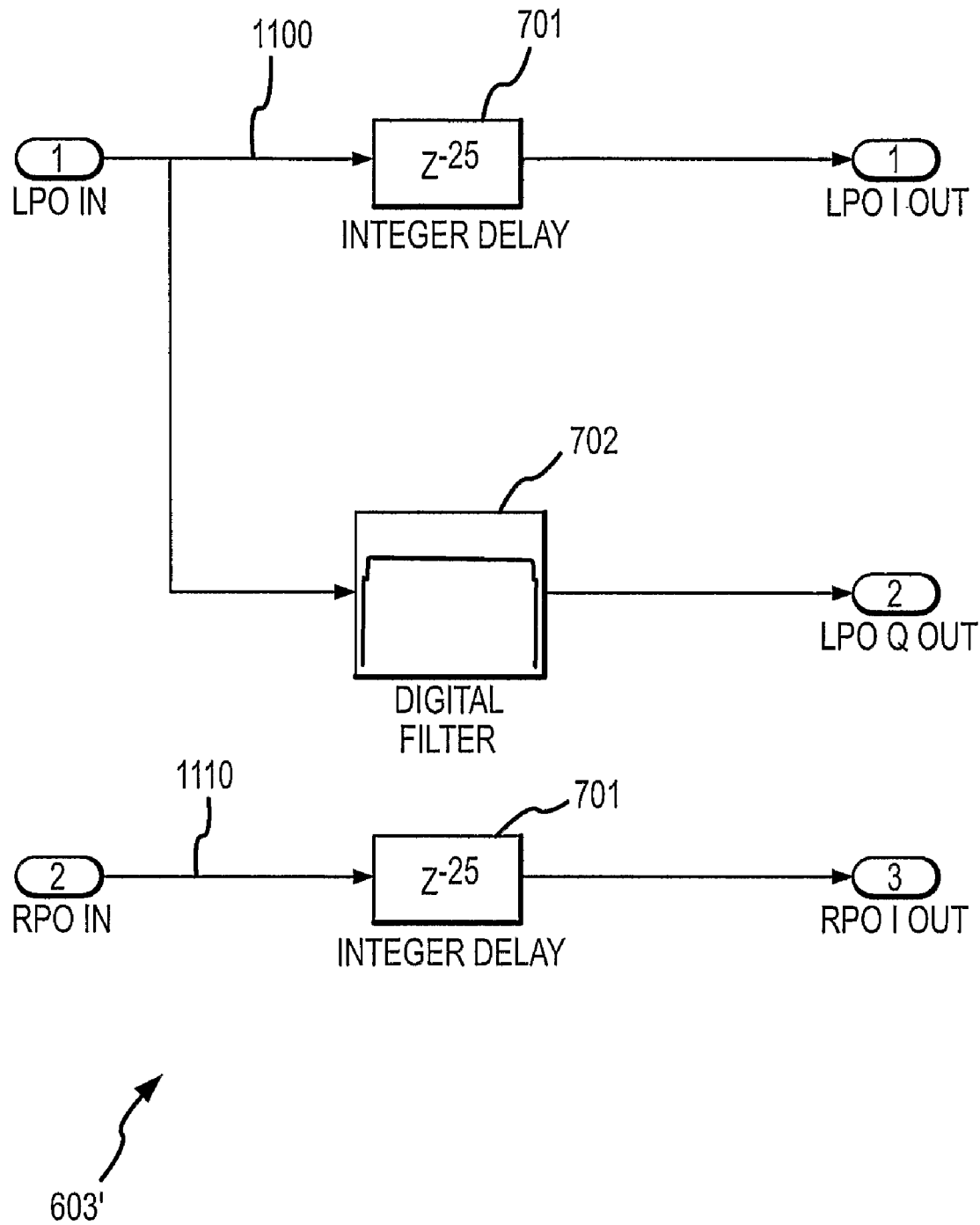
FIG. 11 shows a Hilbert transform block according to the single phase shift embodiment.

FIG. 11 shows an alternative Hilbert transform block 603' according to a single phase shift embodiment. The Hilbert transform block 603' in this embodiment includes a LPO branch 1100 and a RPO branch 1110. The LPO branch 1100 includes a delay block 701 in parallel with a filter block 702. The RPO branch 1110 in this embodiment includes only a delay block 701. As before, the delay blocks 701 introduce sampling delays. As before, the filter block 702 performs a 90 degree phase shift on the inputted digital signal sample. It should be understood that alternatively the Hilbert transform block 603' could phase shift just the RPO signal.

This processing embodiment uses the Hilbert transform/phase shift of only one sensor signal in order to derive both the frequency and the phase difference (see FIGS. 2-3). This significantly reduces the number of computations needed to perform a phase measurement and significantly reduces the number of computations needed to obtain the mass flow rate.

In this embodiment, the output of the Hilbert transform block 603' will provide the quadrature (Q) component of either the left or right sensor signal, but not both. In the example below, the LPO signal is phase shifted.

$$LPO = A_{lpo} \cos(\omega t) \quad (26)$$

$$RPO = A_{rpo} \cos(\omega t + \phi) \quad (27)$$

Using the Hilbert transform, the output becomes:

$$LPO_{hilbert} = A_{lpo} \sin(\omega t) \quad (28)$$

$$RPO = A_{rpo} \cos(\omega t + \phi) \quad (29)$$

Combining the LPO original term with the output of the Hilbert transform (i.e., with the 90 phase shift) yields:

$$LPO = A_{lpo}[\cos(\omega t) + i\sin(\omega t)] = A_{lpo}e^{j(\omega t)} \quad (30)$$

while the RPO stays the same:

$$RPO = A_{rpo}\cos(\omega t + \phi) = A_{rpo}\left[\frac{e^{j(\omega t + \phi)} + e^{-j(\omega t + \phi)}}{2}\right] \quad (31)$$

Figure 12:
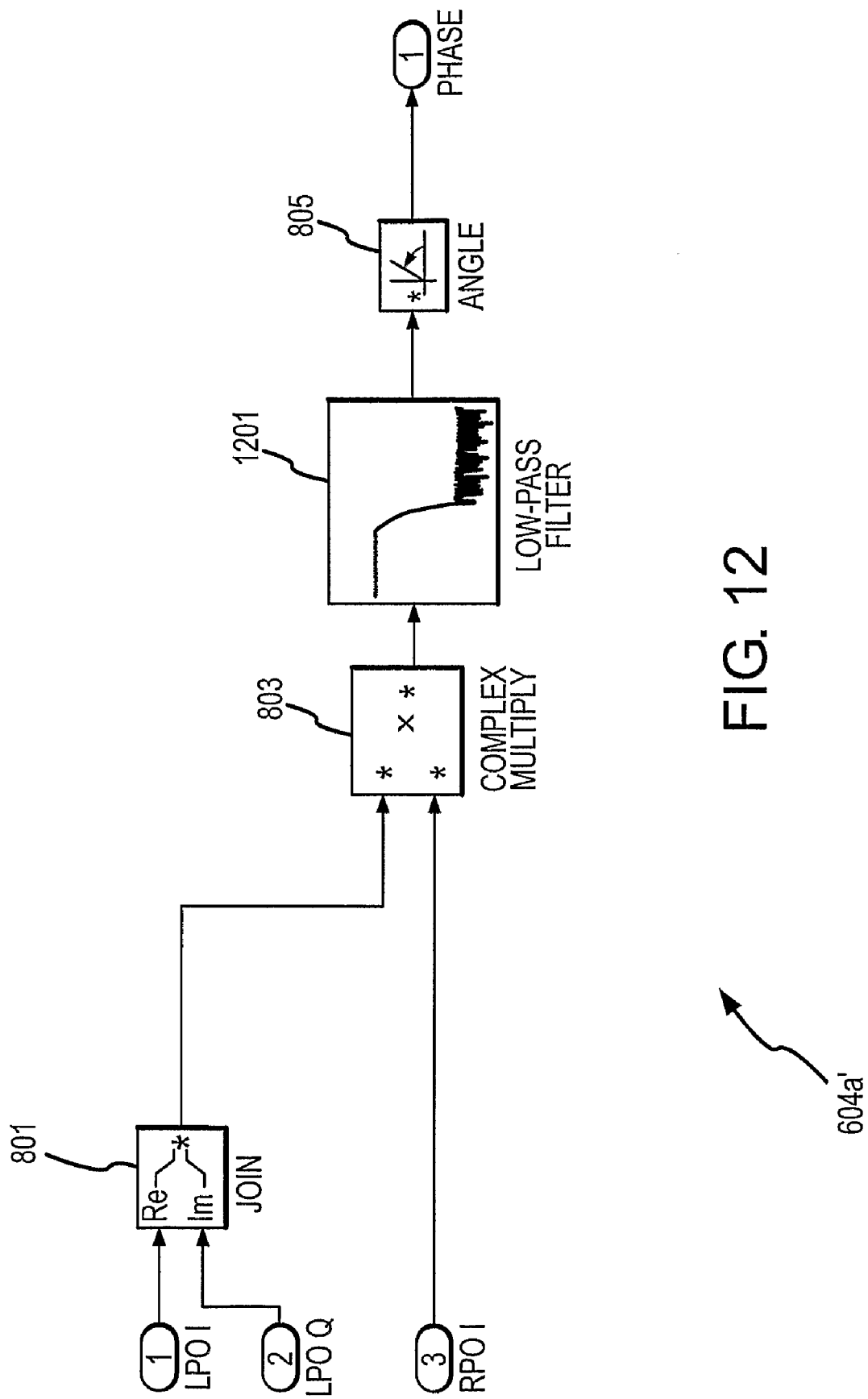
FIG. 12 shows the analysis block for the single phase shift embodiment.

FIG. 12 shows the analysis block 604a' for the single phase shift embodiment. The analysis block 604a' in this embodiment includes one join block 801, the complex multiplication block 803, a low-pass filter block 1201, and a phase angle block 805. The analysis block 604a' in this embodiment implements the following equation:

$$LPO \times RPO = A_{lpo}e^{-j(\omega t)} \times A_{rpo}\left[\frac{e^{j(\omega t + \phi)} + e^{-j(\omega t + \phi)}}{2}\right] \quad (32)$$

$$= \frac{A_{lpo} \times A_{Rpo}}{2}[e^{j(-\omega t + \omega t + \phi)}e^{j(\omega t + \omega t + \phi)}]$$

The low-pass filter block 1201 comprises a low-pass filter that removes a high-frequency component produced by the complex multiplication block 803. The low-pass filter block 1201 can implement any manner of low-pass filtering operation. The result of the multiplication operation produces two terms. The (−ωt+ωt+φ) term combines and simplifies to a phase-only φ term (a DC result), since the (−ωt) and the (ωt) terms cancel each other out. The (ωt+ωt+φ) simplifies to a (2ωt+φ) term, at twice the frequency. Since the result is the sum of 2 terms, the high frequency (2ωt+φ) term can be removed. The only signal of interest here is the DC term. The high frequency (2ωt+φ) term can be filtered out of the result using a low-pass filter. The cut-off of the low-pass filter can be located anywhere between zero and 2ω.

After filtering, the result is:

$$LPO \times RPO = A^2 e^{j(\phi)} = \frac{A^2}{2}[\cos(\phi) + i\sin(\phi)] \quad (33)$$

Therefore, the differential phase angle is:

$$\phi = \tan^{-1}\left[\frac{\sin(\phi)}{\cos(\phi)}\right] \quad (34)$$

By taking the Hilbert transform of one pick-off signal instead of two, the computational load needed to perform phase and frequency estimation in Coriolis mass flow meters is advantageously reduced. The phase and frequency can therefore be determined using two sensor signals, but using only one 90 degree phase shift.

Figure 13:
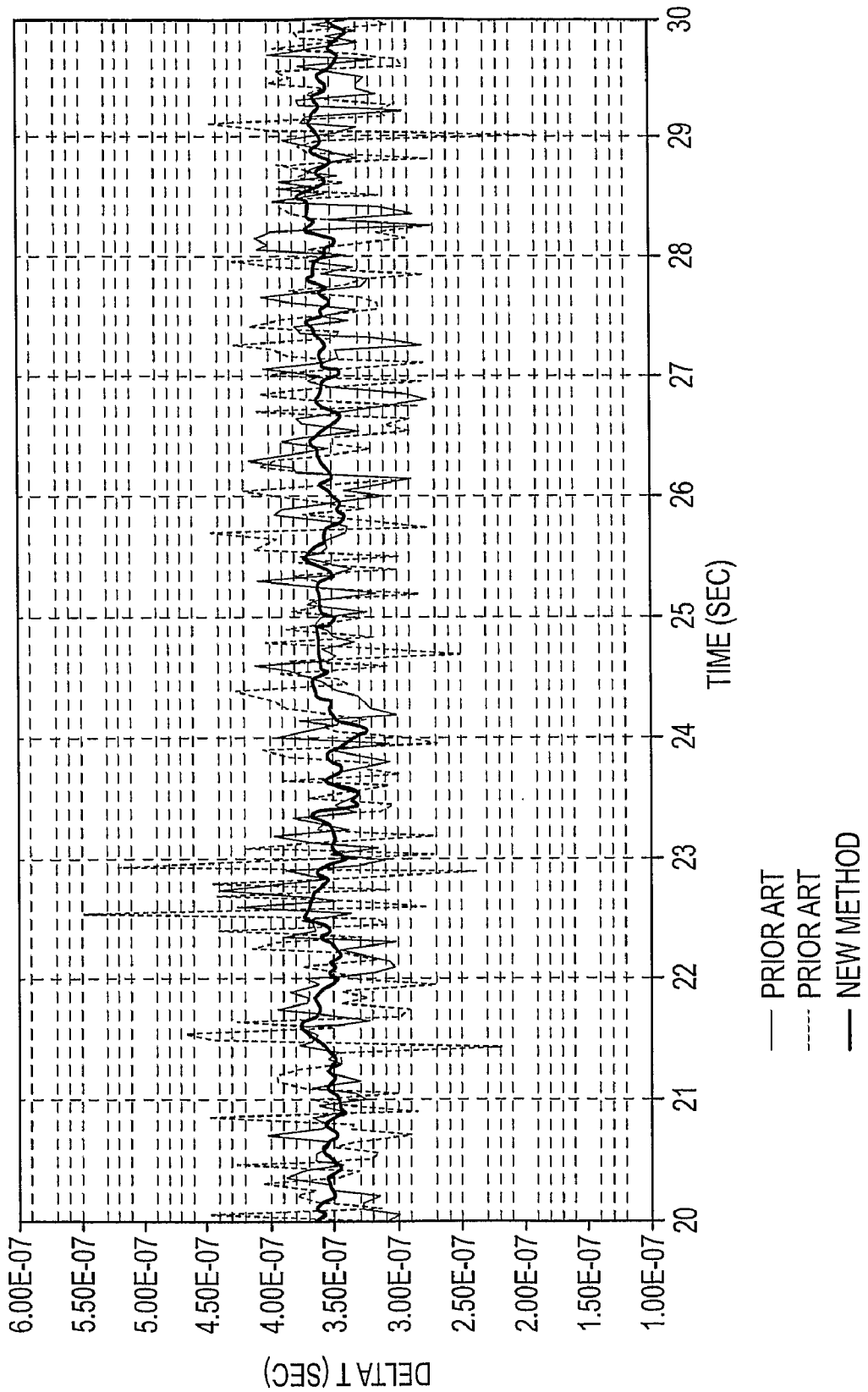
FIG. 13 shows the sensor processing of the invention as compared to the prior art, wherein a time difference ($\Delta t$) value of each is compared.

FIG. 13 shows the sensor processing of the invention as compared to the prior art, wherein a time difference (Δt) value of each is compared. The chart shows a flow material including a gas flow (i. e., gas bubbles, for example). Under this condition, the flow noise is substantially reduced in the new algorithm because of the rate of phase and frequency calculation. It can be seen from the graph that the result derived by the invention does not display the large peaks and valleys that are reflected in prior art (Δt) measurements.

The invention differs from the prior art. First, the prior art typically determines a pickoff frequency using a pickoff signal and an independent frequency source, such as a driver signal sent to a driver system in order to determine the vibrational response frequency. In contrast, the invention determines frequency by shifting the phase of one of the two sensor signals. The prior art does not determine the vibrational response frequency from a phase shift of a sensor signal.

Second, most prior art flowmeters determine a phase difference between pickoff signals using the prior art frequency determination. As a consequence, any error included in the prior art frequency determination is included in the prior art phase difference determination, compounding the overall error in the prior art mass flow rate determination. In contrast, the invention determines the phase difference directly from one or two phase-shifted sensor signals, without using any frequency determination. As a result, any error term is the result of only the phase manipulation and phase measurement of the phase difference determination, and is not affected by any frequency determination error.

Third, the prior art determines the mass flow rate using the independently determined outside frequency. Typically, the prior art also uses a phase difference that has been obtained using the independently determined outside frequency. Consequently, in the prior art, the mass flow rate can be twice affected by any error in the frequency determination, and therefore is not satisfactorily accurate and reliable. In contrast, in the invention the frequency determination and the phase difference determination are independently derived. The frequency determination and the phase difference determination in the invention therefore include a much smaller error component. As a result, using the meter electronics and the method of the invention, the amount of error in the mass flow rate determination is greatly reduced. Consequently, density and volume flow rates according to the invention are also improved in accuracy and reliability.

Fourth, the frequency determination of the prior art takes a relatively long time. In situations where the flow material comprises a two-phase or three-phase flow, such as a liquid including entrained solids and/or entrained gases (such as air bubbles), the prior art frequency determination can take as much as 1-2 seconds to provide a stable and relatively accurate frequency measurement. In contrast, the frequency and phase difference determinations according to the invention can be obtained much faster, such as on the order of milliseconds or hundreds of milliseconds. All flow characteristics derived from the frequency and the phase difference can also be obtained in much less time.

Figure 14:
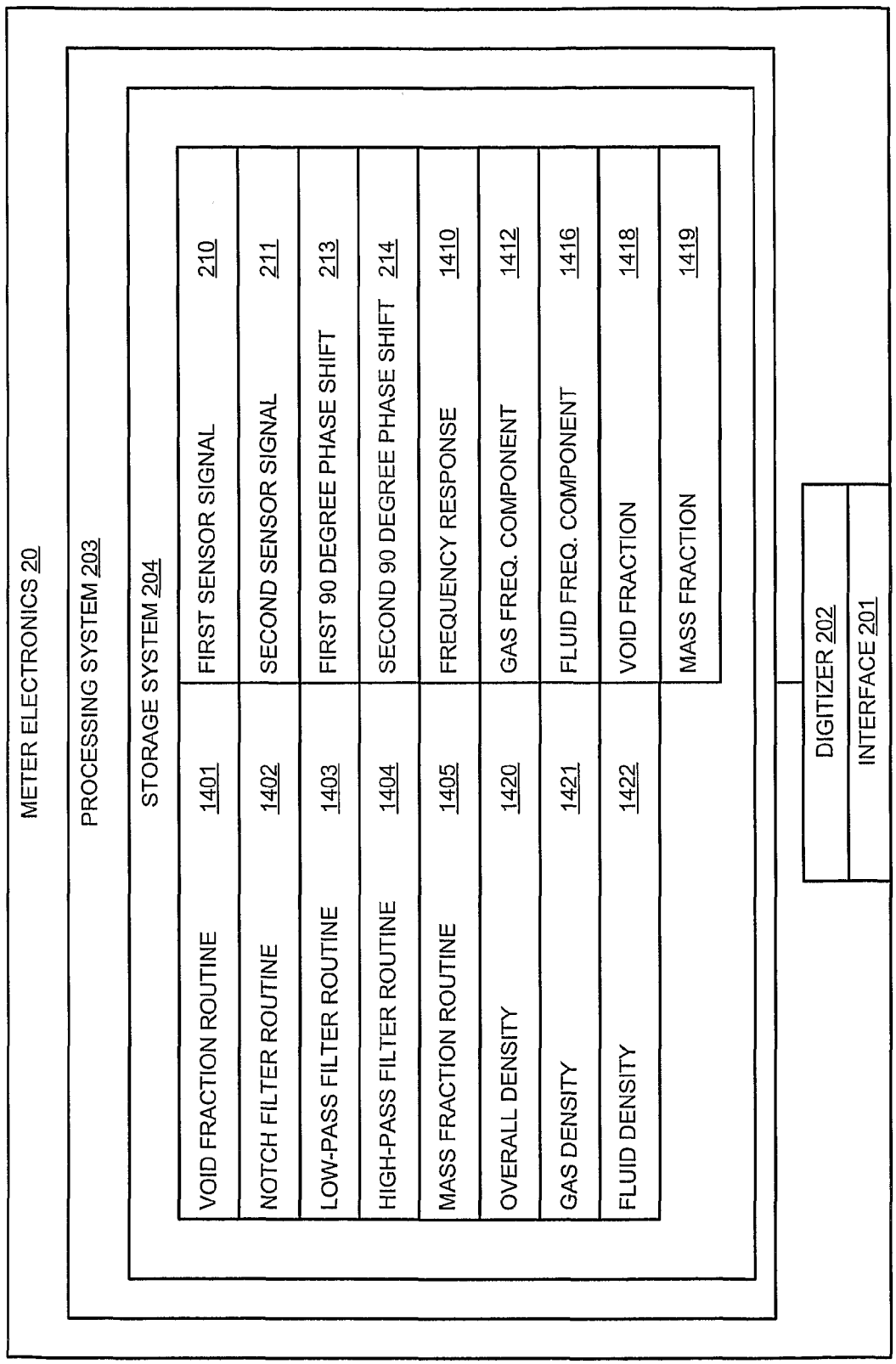
FIG. 14 shows the meter electronics according to another embodiment of the invention.

FIG. 14 shows the meter electronics 20 according to another embodiment of the invention. The meter electronics 20 of this embodiment can include the interface 201, the digitizer 202, the processing system 203, and the storage system 204, as previously discussed. Components and/or routines in common with other embodiments share common reference numbers. It should be understood that the meter electronics 20 of this figure can include various other components and/or routines, such as those previously discussed.

In operation, the meter electronics 20 processes first and second sensor signals from the meter assembly 10 in order to determine a mass fraction of flow components in a flow material flowing through the flow meter 5. Mass fraction is a ratio of mass flow between a first flow component and a second flow component in a two phase flow stream. The mass fraction can be used to determine masses of the various flow components. For example, the flow can comprise a fluid component and a gas component. The total mass flow rate of the flow material can be multiplied by the mass fraction in order to derive one or more of a fluid component mass flow rate and a gas component mass flow rate. The fluid can comprise any manner of fluid and the gas can comprise any manner of gas. The gas can comprise air, for example. The discussion below focuses on air in a fluid, but it should be understood that the invention applies to any gas.

The meter electronics 20 receives and processes a frequency response 1410 of the meter assembly 10, such as a first sensor signal 1410 and a second sensor signal 1411 from the flow meter. The meter electronics 20 breaks out the frequency response 1410 into the gas frequency component 1412 and the fluid frequency component 1416. The meter electronics 20 determines an overall density ($\rho_{mix}$) 1420 from the frequency response 1410. Likewise, a gas component density ($\rho_{gas}$) 1421 is determined from the gas frequency component 1412. The meter electronics 20 uses the frequency response 1410 and one or more of the gas frequency component 1412 and the fluid frequency component 1416 to determine the void fraction of gas 1418. The meter electronics 20 further uses the void fraction 1418, the overall density 1420, and the gas density 1421 to determine the mass fraction 1419. The mass fraction (mf) is defined as:

$$mf = \frac{m_1}{m_1 + m_2} \quad (35)$$

In one embodiment, the mass fraction comprises a mass fraction of gas ($mf_{gas}$). The mass fraction of gas comprises:

$$mf_{gas} = \frac{m_{gas}}{m_{gas} + m_{fluid}} \quad (36)$$

However, it should be understood that alternatively the invention can determine a mass fraction of fluid ($mf_{fluid}$) in the flow material (or any other mass fraction). The mass fraction of fluid ($mf_{fluid}$) comprises the complement of the mass fraction of gas:

$$mf_{fluid} = \frac{m_{fluid}}{m_{gas} + m_{fluid}} \quad (37)$$

However, this discussion will focus on the mass flow of gas ($mf_{gas}$) for purposes of simplicity.

The first sensor signal 1410 and the second sensor signal 1411 comprise time-varying electronic signals that are substantially continuously received and processed by the meter electronics 20, such as signals from the pick-off sensors 170L and 170R. The frequency response 1410 can be determined using the previously discussed processing blocks (see FIGS. 6-7 and 9). Advantageously, when using the previously discussed high-speed frequency determination, the invention can quickly, accurately, and reliably determine the void fraction of gas 1418.

The processing system 203 in this embodiment can include a void fraction routine 1401, a notch filter routine 1402, and a mass fraction routine 1405. The processing system 203 can further include one or more filters or filter routines, such as a low-pass filter routine 1403 and a high-pass filter routine 1404. Alternatively, the one or more filters or filter routines can include a notch filter configuration or other filter configuration that rejects a narrow band of frequencies. The processing system 203 can further include a frequency response 1410, a void fraction 1418, and a mass fraction 1419 that can store frequency response measurements, void fraction determinations, and mass fraction determinations, respectively. The processing system 203 can further include a fluid frequency component 1416 and a gas frequency component 1412 that store working frequency values for the void fraction and mass fraction determinations. The processing system 203 can further include an overall density 1420, a gas component density 1421, and a fluid component density 1422 that store working density values for the void fraction and mass fraction determinations.

The frequency response 1410 comprises a mix frequency ($f_{mix}$), wherein the frequency response 1410 can include an gas frequency component ($f_{gas}$) 1412 and a fluid frequency component ($f_{fluid}$) 1416. The void fraction and mass fraction can be determined after these frequency components are broken out of the mix frequency ($f_{mix}$) and determined. At any time, the frequency response 1410 can include any amount of a gas frequency component ($f_{gas}$) 1412 (i.e., entrained gas).

Figure 15:
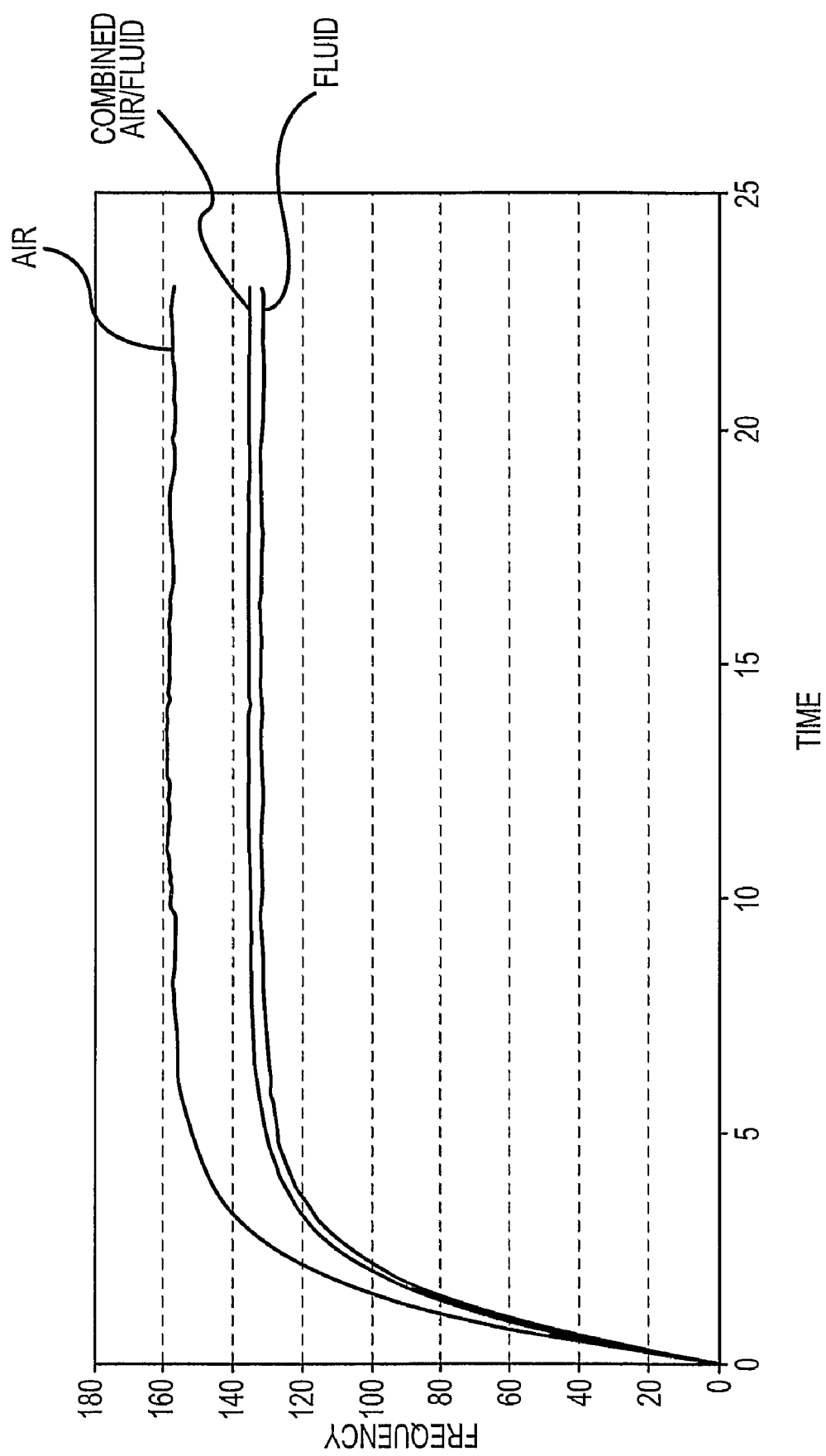
FIG. 15 is a graph of flow meter frequency responses for air, for a fluid, and for a combined air/fluid mix (i.e., for a fluid including entrained air).

FIG. 15 is a graph of flow meter frequency responses for air, for a fluid, and for a combined air/fluid mix (i.e., for a fluid including entrained air). The density of a gas is distinguishable from the density of a fluid in the flow material flowing through the flow meter. Since density can be derived from a measured frequency, the frequency associated with air is also distinguishable from the frequency of the fluid. This is also true of other gases or gas mixtures.

An equation for calculating frequency is:

$$\omega t - \omega t_{-1} = \tan^{-1}\left[\frac{\sin(\omega t - \omega t_{-1})}{\cos(\omega t - \omega t_{-1})}\right] \quad (38)$$

where $\omega$ is the radian frequency of the Coriolis flow meter. The $\omega_{-1}$ term represents a radian frequency sample from a previous or earlier sample period. Converting the radian frequency $\omega$ to a frequency f in Hertz (Hz) gives:

$$f_{fluid} = \frac{(\omega t - \omega t_{-1}) \times F_s}{2\pi} \quad (39)$$

This equation assumes only one frequency is present. If two frequencies are present, as in the case of entrained air (the frequency of air and the frequency of the flow material fluid), the new equation becomes:

$$f_{mix} = \frac{F_s}{2\pi} \times \left(\tan^{-1}\left[\frac{A_{fluid}^2 \sin(\omega_{fluid} t - w_{fluid} t_{-1}) +}{A_{air}^2 \sin(\omega_{air} t - \omega_{air} t_{-1})}\right] \middle/ \left[\frac{A_{fluid}^2 \cos(\omega_{fluid} t - w_{fluid} t_{-1}) +}{A_{air}^2 \cos(\omega_{air} t - \omega_{air} t_{-1})}\right]\right) \quad (40)$$

where $f_{mix}$ is the frequency response of the entire flow material, including a gas frequency component ($f_{gas}$) and a fluid frequency component ($f_{fluid}$).

Referring again to FIG. 14, the low-pass filter routine 1403 implements a low-pass filter. A low-pass filter passes low frequencies substantially below a low-pass cut-off frequency. A low-pass filter therefore can be used to remove high frequencies.

The high-pass filter routine 1404 implements a high-pass filter. A high-pass filter passes high frequencies substantially above a high-pass cut-off frequency. A high-pass filter therefore can be used to remove low frequencies.

The notch filter routine 1402 implements a notch filter. A notch filter rejects a narrow range of frequencies that are centered on a "notch" in the frequency response of the notch filter. Only the frequencies in the notch are rejected by the notch filter. Therefore, the notch filter is very useful for removing known, undesired frequencies from the frequency response 1410.

The void fraction routine 1401 determines a void fraction (typically of gas) in the flow material. The void fraction can be determined from the densities of the flow components, where the overall density ($\rho_{mix}$) comprises the sum of the gas component density ($\rho_{gas}$) and the fluid component density ($\rho_{fluid}$).

Density ($\rho$) substantially comprises:

$$\rho \cong \left(\frac{1}{f}\right)^2 \quad (41)$$

where f is the frequency measurement of the fluid frequency component 1416 (i.e., $f_{mix}$). The fluid component density ($\rho_{fluid}$) 1422 can be calculated using the fluid frequency component 1416. In one embodiment, the fluid frequency component 1416 comprises an average mixture frequency. The gas component density ($\rho_{gas}$) 1421 can be calculated using the gas frequency component 1412. Consequently, the void fraction of gas 1418 is calculated as a ratio of the fluid component density ($\rho_{fluid}$) 1422 minus the overall density ($\rho_{mix}$) 1420 divided by the fluid component density ($\rho_{fluid}$) 1422 minus the gas component density ($\rho_{gas}$) 1421. The void fraction computation has the form:

$$\text{Void\_Fraction} = \frac{\rho_{fluid} - \rho_{mix}}{\rho_{fluid} - \rho_{gas}} \quad (42)$$

The resulting void fraction of gas 1418 reflects a ratio of gas to fluid in the flow material.

The mass fraction routine 1405 determines the mass fraction 1419 from the frequency response 1410. In one embodiment, the mass fraction routine 1405 uses the determined void fraction (VF) 1418, along with derived density values, in order to calculate the mass fraction 1419.

Mass (m) and volume (V) are related by density ($\rho$). Therefore, density comprises:

$$\rho = \frac{m}{V} \quad (43)$$

As a result, the mass fraction (mf) can be simplified to:

$$mf = \frac{m_1}{m_1 + m_2} = \frac{m_1}{m_{mix}} = \frac{\rho_1 V_1}{\rho_{mix} V_{mix}} \quad (44)$$

Because the void fraction (VF) comprises the volume ratio:

$$VF = \frac{V_1}{V_{mix}} \quad (45)$$

then the mass fraction (mf) comprises:

$$mf = VF * \frac{\rho_1}{\rho_{mix}} \quad (46)$$

As a result, the mass fraction can be determined from the void fraction (VF), the gas component density ($\rho_{gas}$) 1421, and the overall density ($\rho_{mix}$) 1422. The gas component density ($\rho_{gas}$) 1421 and the overall density ($\rho_{mix}$) 1422 can be determined from the gas frequency component 1412 and the frequency response 1410, respectively.

It should be understood that only one of the gas frequency component 1412 and the fluid frequency component 1416 may be needed if either the gas or the fluid is known. For example, if the gas comprises air, then a standard air frequency response (and density) can be assumed. As a result, the known gas or fluid frequency can be filtered out, and only one filtering step is needed.

The meter electronics 20 can additionally determine other flow characteristics, such as an overall mass flow rate, a component mass flows, component volumes, etc. The meter electronics 20 can be in communication with the meter assembly 10, where the meter assembly 10 can comprise any manner of flow meter that generates a frequency response. In one embodiment, the meter assembly 10 comprises a Coriolis flow meter. In another embodiment, the meter assembly 10 comprises a vibrating densitometer.

Figure 16:
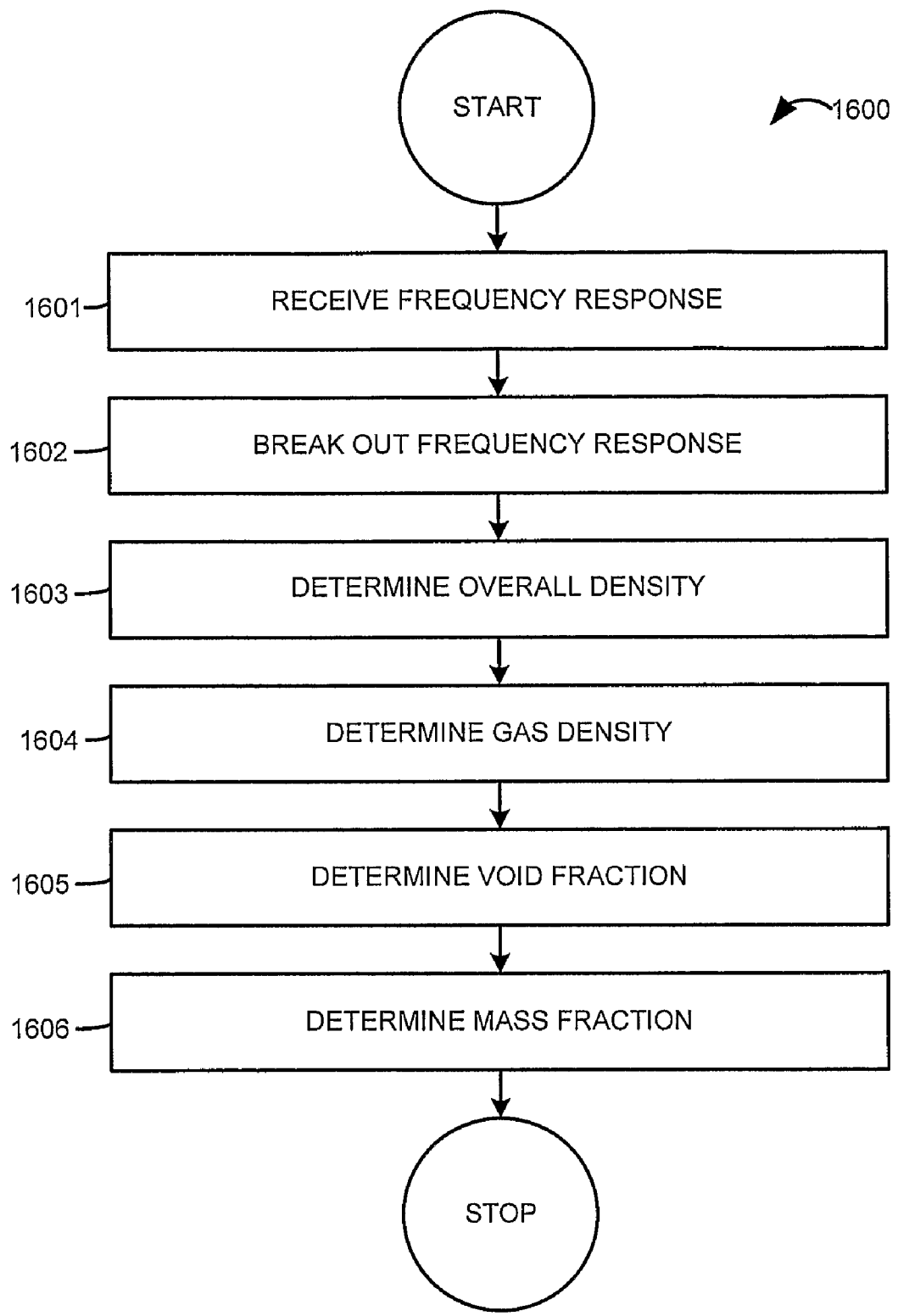
FIG. 16 is a flowchart of a method for determining a mass fraction of flow components in a flow material flowing through a flow meter according to an embodiment of the invention.

FIG. 16 is a flowchart 1600 of a method for determining a mass fraction of flow components in a flow material flowing through a flow meter according to an embodiment of the invention. In step 1601, a frequency response is received. The frequency response can be received in the meter electronics 20, for example. The frequency response comprises a frequency response to a vibrating meter assembly 10 that includes the flow material.

In step 1602, the frequency response is broken out into a gas frequency component 1412 and a fluid frequency component 1416. This is possible because the frequency response 1410 comprises a gas frequency component that is related to a gas flow rate in the flow material and a fluid frequency component that is related to the fluid flow rate. The breaking out can be performed by one or more filters, as previously discussed.

In step 1603, an overall density ($\rho_{mix}$) is determined from the frequency response. The overall density ($\rho_{mix}$) reflects the density of the combined fluid and gas flow components. As previously discussed, the overall density ($\rho_{mix}$) comprises substantially the square of one divided by the frequency response (i.e., the frequency response inverted).

In step 1604, a gas component density ($\rho_{gas}$) is determined from the gas frequency component ($f_{gas}$). The gas component density ($\rho_{gas}$) reflects the density of just the gas flow component.

In step 1605, as previously discussed, the void fraction (VF) of gas 1418 is determined using the frequency response 1410, the gas frequency component 1412, and the fluid frequency component 1416. The resulting void fraction of gas 1418 can be expressed as a ratio, a percentage, or other measure.

In step 1606, the mass fraction is determined from the void fraction (VF) 1418 and a ratio of the gas density ($\rho_{gas}$) to overall density ($\rho_{mix}$), as shown in equation 46.

Figure 17:
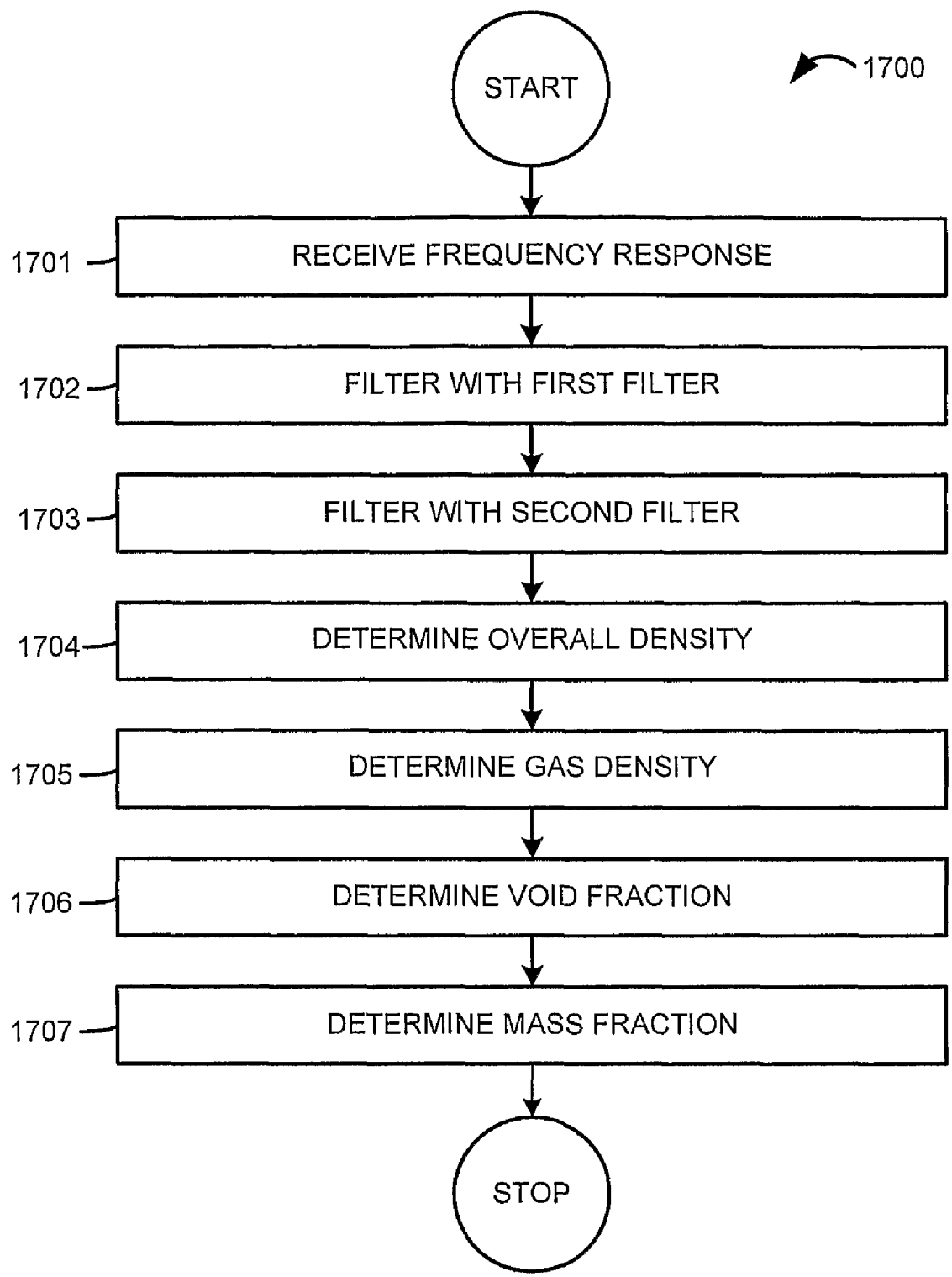
FIG. 17 is a flowchart of a method for determining a mass fraction of flow components in a flow material flowing through a flow meter according to an embodiment of the invention.

FIG. 17 is a flowchart 1700 of a method for determining a mass fraction of flow components in a flow material flowing through a flow meter according to an embodiment of the invention. One method of breaking out the fluid and gas frequency components from the frequency response comprises performing two filtering operations. One filtering operation comprises filtering the frequency response with a first filter that substantially rejects the gas frequency component and substantially passes the fluid frequency component. The second filtering operation comprises filtering the frequency response with a second filter that substantially rejects the fluid frequency component and substantially passes the gas frequency component. As a result, the first filter outputs the fluid frequency component while the second filter outputs the gas frequency component.

In step 1701, a frequency response is received, as previously discussed.

In step 1702, the frequency response is filtered with a first filter. The first filter substantially rejects the gas frequency component and substantially passes the fluid frequency component (see FIG. 18). In one embodiment, the first filter comprises a low-pass filter, wherein a low-pass cut-off frequency of the low-pass filter is substantially above the fluid frequency component. As a result, the low-pass filter substantially passes the fluid frequency component and substantially rejects the gas frequency component.

In step 1703, the frequency response is filtered with a second filter. The second filter substantially rejects the fluid frequency component and substantially passes the gas frequency component. In one embodiment, the second filter comprises a high-pass filter, wherein a high-pass cut-off frequency of the high-pass filter is substantially below the gas frequency component (but above the fluid frequency component). As a result, the high-pass filter substantially passes the gas frequency component and substantially rejects the fluid frequency component.

In step 1704, the overall density ($\rho_{mix}$) is determined, as previously discussed.

In step 1705, the gas density ($\rho_{gas}$) is determined, as previously discussed.

In step 1706, as previously discussed, the void fraction of gas 1418 is determined using the frequency response 1410, the gas frequency component 1412, and the fluid frequency component 1416.

In step 1707, the mass fraction 1419 is determined, as previously discussed.

Figure 18:
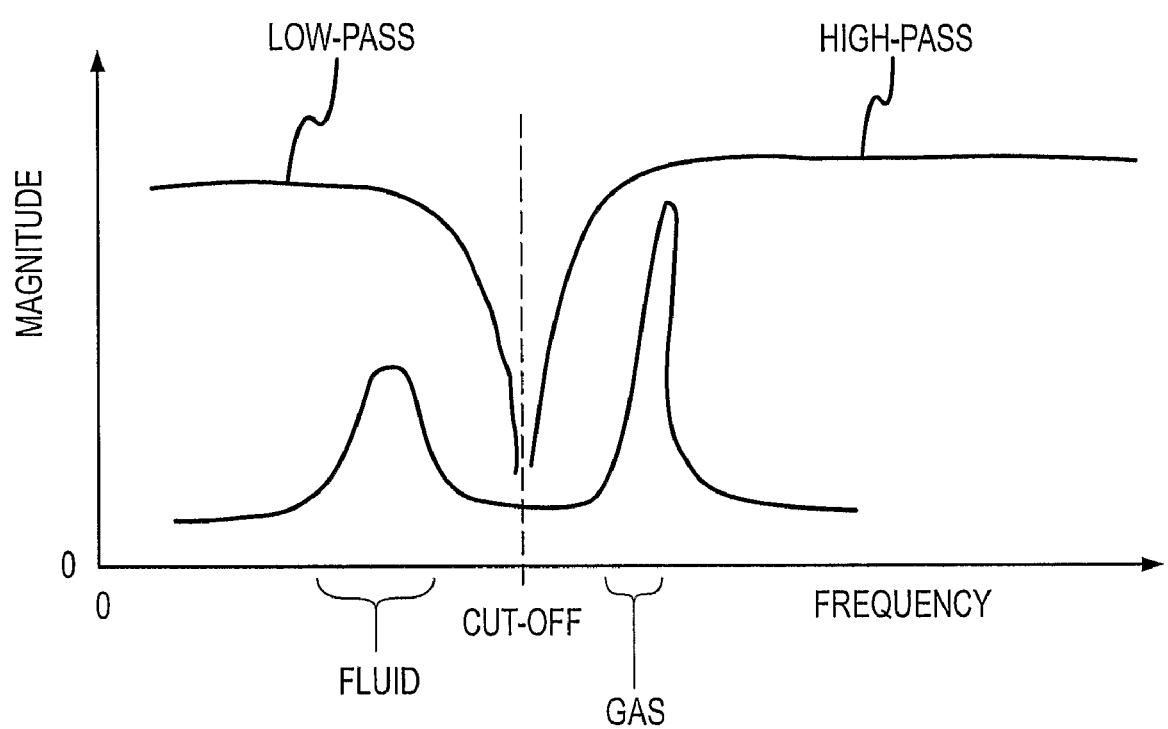
FIG. 18 is a frequency graph showing low-pass and high-pass filter responses that can be used to break out the fluid frequency component and the gas frequency component according to an embodiment of the invention.

FIG. 18 is a frequency graph showing low-pass and high-pass filter responses that can be used to break out the fluid frequency component and the gas frequency component according to an embodiment of the invention. The lower line of the graph represents a flow meter frequency response including a fluid frequency component lobe and a gas frequency component lobe. The fluid frequency component lobe is lower in frequency than the gas frequency component lobe. The upper lines comprise a low-pass filter response and a high-pass filter response, along with a cut-off frequency. Here, the cut-off frequency for both the low-pass and high-pass filters is substantially centered between the two lobes. The low-pass and high-pass filters can have a common cut-off frequency or can have different cut-off frequencies, depending on the fluid and gas frequency components. It can be seen that the low-pass filter will output the fluid frequency component and the high-pass filter will output the gas frequency component. Therefore, the two filters can break out the frequency response 1410 into the gas frequency component 1412 and the fluid frequency component 1416.

Another method of breaking out the fluid and gas frequency components comprises filtering out a single, known frequency component and using the frequency component passed by the filter operation in order to determine the fluid and gas component densities. For example, where gas in the flow material is air, then the filtering operation can be configured to filter out a relatively narrow frequency band centered on a typical air frequency response. Subsequently, the overall density derived from the frequency response and the fluid density component derived from the remaining fluid frequency component can be used to determine an air density term. For example, where the gas is known to be atmospheric air, a filter (such as a notch filter, for example) can be used to substantially reject an air frequency component of the frequency response. As a result, the overall density ($\rho_{mix}$) 1420 can be calculated from the frequency response 1410 and a fluid component density ($\rho_{fluid}$) 1422 can be calculated from the fluid frequency component 1416. Therefore, the air component density ($\rho_{gas}$) 1421 comprises:

$$\rho_{mix} = \rho_{fluid}(1-VF) + \rho_{gas} \quad (47)$$

This equation can be rewritten as:

$$\rho_{mix} = \rho_{fluid}\phi_{fluid} - \rho_{gas}\phi_{gas} \quad (48)$$

Alternatively, it should be understood that the fluid frequency component can be removed/filtered out, and the void fraction can be determined using the gas frequency component. As before, this single frequency removal can be performed where the fluid possesses a known characteristic frequency response and density. Therefore, the single frequency removal method can remove either the fluid frequency component or the gas frequency component.

In one embodiment, a single frequency component can be removed by one or more filters while the other frequency component is passed by the filtering operation. The one or more filters in one embodiment comprise a notch filter. A notch filter passes all frequencies except frequencies within a narrow band (i.e., a notch in the frequency response). Alternatively, the one or more filters can comprise any satisfactory filter or combination of filters.

Figure 19:
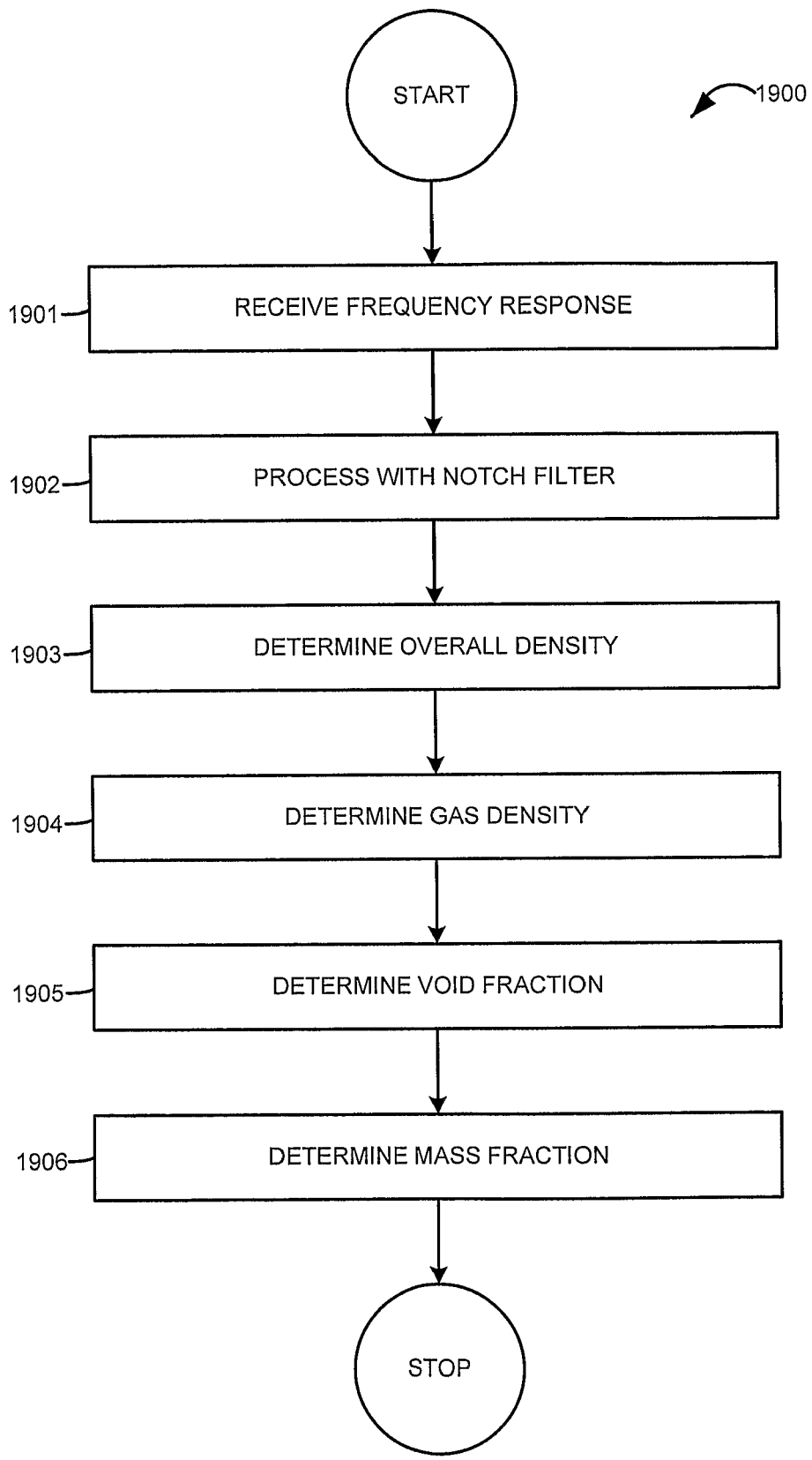
FIG. 19 is a flowchart of a method for determining a mass fraction of flow components in a flow material flowing through a flow meter according to an embodiment of the invention.

FIG. 19 is a flowchart 1900 of a method for determining a mass fraction of flow components in a flow material flowing through a flow meter according to an embodiment of the invention. In step 1901, the frequency response 1410 is received, as previously discussed.

In step 1902, the frequency response is processed with a notch filter. The notch filter passes frequencies above and below a notch, such as above and below the gas frequency response in this embodiment. Therefore, the notch filter substantially rejects the gas frequency component 1412. The notch filter substantially passes the fluid frequency component 1416.

Figure 20:
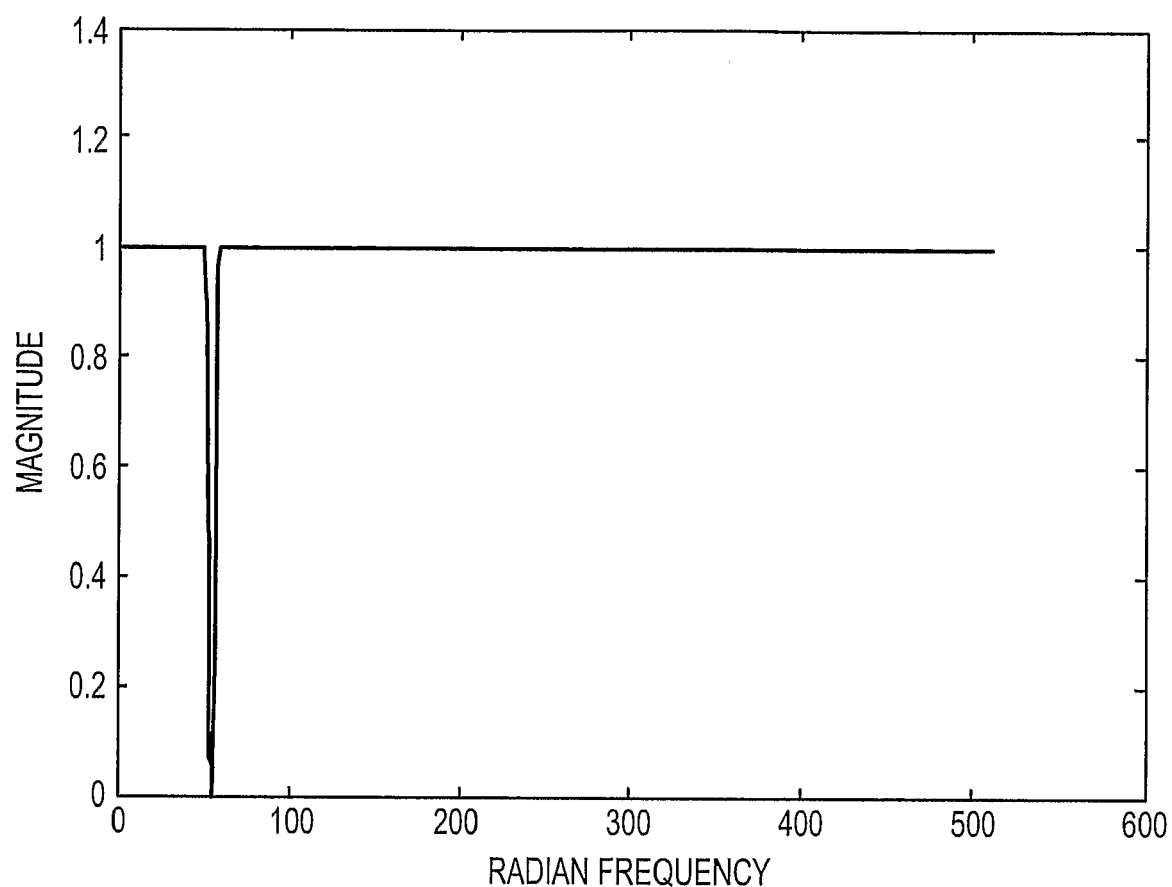
FIG. 20 is a graph of a notch filter frequency response.

FIG. 20 is a graph of a notch filter frequency response. In the example shown, the notch is centered on a gas frequency. The notch filter passes substantially all of the frequencies above and below the notch and only the gas frequency is substantially rejected by the notch filter.

Referring again to FIG. 19, in step 1903 the overall density ($\rho_{mix}$) is determined, as previously discussed.

In step 1904, the gas density ($\rho_{gas}$) is determined, as previously discussed.

In step 1905 the void fraction of gas 1418 is determined, as previously discussed.

In step 1906, the mass fraction 1419 is determined, as previously discussed.

The meter electronics and method according the invention can be implemented according to any of the embodiments in order to obtain several advantages, if desired. The invention can determine a mass fraction in a two phase flow. The invention can determine a mass fraction in a multi-phase flow. The invention can determine a mass fraction of gas or a mass fraction of fluid. The invention can determine a mass fraction of air. The invention can determine masses of individual flow components, such as a gas flow mass and a fluid flow mass, for example. The invention can provide a mass fraction determination of greater accuracy and reliability. The invention can provide a mass fraction determination faster than the prior art and while consuming less processing time.

We claim:

1. Meter electronics (20) for determining a mass fraction of flow components in a flow material flowing through a flow meter (5), the meter electronics (20) comprising:
   an interface (201) for receiving a frequency response of the flow material; and
   a processing system (203) in communication with the interface (201) and configured to receive the frequency response from the interface (201), break out the frequency response into at least a gas frequency component and a fluid frequency component, determine an overall density from the frequency response, determine a gas density from the gas frequency component, determine the void fraction of gas from the frequency response and one or more of the gas frequency component and the fluid frequency component, and determine the mass fraction from the void fraction of gas multiplied by a ratio of the gas density divided by the overall density.

2. The meter electronics (20) of claim 1, with the gas density comprising an inverse of the gas frequency squared and with the overall density comprising an inverse of the frequency squared.

3. The meter electronics (20) of claim 1, with the processing system (203) being farther configured to determine a mass flow rate of the flow material from the frequency response and determine at least one of a first flow component mass and a second flow component mass using the mass fraction and the mass flow rate.

4. The meter electronics (20) of claim 3, with the frequency response comprising a first sensor signal and a second sensor signal and with the processing system (203) being further configured to determine a substantially instantaneous frequency and determine a substantially instantaneous phase difference, wherein the mass flow rate is determined using the frequency and the phase difference.

5. The meter electronics (20) of claim 3, with the frequency response comprising a first sensor signal and a second sensor signal and with the processing system (203) being further configured to determine a substantially instantaneous frequency, determine a substantially instantaneous phase difference, divide the phase difference by the frequency in order to obtain a time delay, and multiply the time delay by a constant in order to obtain the mass flow rate.

6. The meter electronics (20) of claim 3, with the frequency response comprising a first sensor signal and a second sensor signal and with the processing system (203) being further configured to generate a first 90 degree phase shift from the first sensor signal, compute the frequency using the first 90 degree phase shift and the first sensor signal, determine a substantially instantaneous phase difference, divide the phase difference by the frequency in order to obtain a time delay, and multiply the time delay by a constant in order to obtain the mass flow rate.

7. The meter electronics (20) of claim 3, with the frequency response comprising a first sensor signal and a second sensor signal and with the processing system (203) being further configured to generating a first 90 degree phase shift from the first sensor signal, computing the phase difference using the first 90 degree phase shift, the first sensor signal, and the second sensor signal, determining a substantially instantaneous phase difference, dividing the phase difference by the frequency in order to obtain a time delay, and multiplying the time delay by a constant in order to obtain the mass flow rate.

8. The meter electronics (20) of claim 3, with the frequency response comprising a first sensor signal and a second sensor signal and with the processing system (203) being further configured to generating a first 90 degree phase shift from the first sensor signal, generating a second 90 degree phase shift from the second sensor signal, computing the phase difference using the first 90 degree phase shift, the second 90degree phase shift, the first sensor signal, and the second sensor signal, determining a substantially instantaneous phase difference, dividing the phase difference by the frequency in order to obtain a time delay, and multiplying the time delay by a constant in order to obtain the mass flow rate.

9. The meter electronics (20) of claim 3, with the frequency response comprising a first sensor signal and a second sensor signal and with the processing system (203) being further configured to generate a 90 degree phase shift from the first sensor signal, compute a frequency response using the 90 degree phase shift and the first sensor signal, compute a phase difference using at least the 90 degree phase shift, the first sensor signal, and the second sensor signal, compute a time delay using the frequency response and the phase difference, compute the mass flow rate from the time delay, determine a substantially instantaneous phase difference, divide the phase difference by the frequency in order to obtain a time delay, and multiply the time delay by a constant in order to obtain the mass flow rate.

10. A method for determining a mass fraction of flow components in a flow material flowing through a flow meter, the method comprising:
   receiving a frequency response of the flow material in a meter electronics of the flow meter;
   the meter electronics breaking out the frequency response into at least a gas frequency component and a fluid frequency component;
   the meter electronics determining an overall density from the frequency response;
   the meter electronics determining a gas density from the gas frequency component;
   the meter electronics determining the void fraction of gas from the frequency response and one or more of the gas frequency component and the fluid frequency component; and
   the meter electronics determining the mass fraction from the void fraction of gas multiplied by a ratio of the gas density divided by the overall density.

11. The method of claim 10, with the gas density comprising an inverse of the gas frequency squared and with the overall density comprising an inverse of the frequency squared.

12. The method of claim 10, further comprising:
   determining a mass flow rate of the flow material from the frequency response; and
   determining at least one of a first flow component mass and a second flow component mass using the mass fraction and the mass flow rate.

13. The method of claim 12, with the determining the mass flow rate comprising:
   determining a substantially instantaneous frequency; and
   determining a substantially instantaneous phase difference, wherein the mass flow rate is determined using the frequency and the phase difference.

14. The method of claim 12, with the frequency response comprising a first sensor signal and a second sensor signal and with the determining the mass flow rate comprising:
   determining a substantially instantaneous frequency;
   determining a substantially instantaneous phase difference;
   dividing the phase difference by the frequency in order to obtain a time delay; and
   multiplying the time delay by a constant in order to obtain the mass flow rate.

15. The method of claim 12, with the frequency response comprising a first sensor signal and a second sensor signal and with the determining the mass flow rate further comprising:
  generating a first 90 degree phase shift from the first sensor signal;
  computing the frequency using the first 90 degree phase shift and the first sensor signal;
  determining a substantially instantaneous phase difference;
  dividing the phase difference by the frequency in order to obtain a time delay; and
  multiplying the time delay by a constant in order to obtain the mass flow rate.

16. The method of claim 12, with the frequency response comprising a first sensor signal and a second sensor signal and with the determining the mass flow rate further comprising:
  generating a first 90 degree phase shift from the first sensor signal;
  computing the phase difference using the first 90 degree phase shift, the first sensor signal, and the second sensor signal;
  determining a substantially instantaneous phase difference;
  dividing the phase difference by the frequency in order to obtain a time delay; and
  multiplying the time delay by a constant in order to obtain the mass flow rate.

17. The method of claim 12, with the frequency response comprising a first sensor signal and a second sensor signal and with the determining the mass flow rate further comprising:
  generating a first 90 degree phase shift from the first sensor signal;
  generating a second 90 degree phase shift from the second sensor signal;
  computing the phase difference using the first 90 degree phase shift, the second 90 degree phase shift, the first sensor signal, and the second sensor signal;
  determining a substantially instantaneous phase difference;
  dividing the phase difference by the frequency in order to obtain a time delay; and
  multiplying the time delay by a constant in order to obtain the mass flow rate.

18. The method of claim 12, with the frequency response comprising a first sensor signal and a second sensor signal and with the determining the mass flow rate further comprising:
  generating a 90 degree phase shift from the first sensor signal;
  computing a frequency response using the 90 degree phase shift and the first sensor signal;
  computing a phase difference using at least the 90 degree phase shift, the first sensor signal, and the second sensor signal;
  computing a time delay using the frequency response and the phase difference;
  computing the mass flow rate from the time delay;
  determining a substantially instantaneous phase difference;
  dividing the phase difference by the frequency in order to obtain a time delay; and
  multiplying the time delay by a constant in order to obtain the mass flow rate.

19. A method for determining a mass fraction of flow components in a flow material flowing through a flow meter, the method comprising:
  receiving a frequency response of the flow material in a meter electronics of the flow meter;
  the meter electronics processing the frequency response with a notch filter that substantially rejects one of a gas frequency component and a fluid frequency component;
  the meter electronics determining an overall density from the frequency response;
  the meter electronics determining a gas density from the gas frequency component;
  the meter electronics determining the void fraction of gas from the frequency response and one or more of the gas frequency component and the fluid frequency component; and
  the meter electronics determining the mass fraction from the void fraction of gas multiplied by a ratio of the gas density divided by the overall density.

20. The method of claim 19, with the gas density comprising an inverse of the gas frequency squared and with the overall density comprising an inverse of the frequency squared.

21. The method of claim 19, further comprising:
  determining a mass flow rate of the flow material from the frequency response; and
  determining at least one of a first flow component mass and a second flow component mass using the mass fraction and the mass flow rate.

22. The method of claim 21, with the determining the mass flow rate comprising:
  determining a substantially instantaneous frequency; and
  determining a substantially instantaneous phase difference, wherein the mass flow rate is determined using the frequency and the phase difference.

23. The method of claim 21, with the frequency response comprising a first sensor signal and a second sensor signal and with the determining the mass flow rate comprising:
  determining a substantially instantaneous frequency;
  determining a substantially instantaneous phase difference;
  dividing the phase difference by the frequency in order to obtain a time delay; and
  multiplying the time delay by a constant in order to obtain the mass flow rate.

24. The method of claim 21, with the frequency response comprising a first sensor signal and a second sensor signal and with the determining the mass flow rate further comprising:
  generating a first 90 degree phase shift from the first sensor signal;
  computing the frequency using the first 90 degree phase shift and the first sensor signal;
  determining a substantially instantaneous phase difference;
  dividing the phase difference by the frequency in order to obtain a time delay; and
  multiplying the time delay by a constant in order to obtain the mass flow rate.

25. The method of claim 21, with the frequency response comprising a first sensor signal and a second sensor signal and with the determining the mass flow rate further comprising:
  generating a first 90 degree phase shift from the first sensor signal;
  computing the phase difference using the first 90 degree phase shift, the first sensor signal, and the second sensor signal;
  determining a substantially instantaneous phase difference;
  dividing the phase difference by the frequency in order to obtain a time delay; and
  multiplying the time delay by a constant in order to obtain the mass flow rate.

26. The method of claim 21, with the frequency response comprising a first sensor signal and a second sensor signal and with the determining the mass flow rate further comprising:
   generating a first 90 degree phase shift from the first sensor signal;
   generating a second 90 degree phase shift from the second sensor signal;
   computing the phase difference using the first 90 degree phase shift, the second 90 degree phase shift, the first sensor signal, and the second sensor signal;
   determining a substantially instantaneous phase difference;
   dividing the phase difference by the frequency in order to obtain a time delay; and
   multiplying the time delay by a constant in order to obtain the mass flow rate.

27. The method of claim 21, with the frequency response comprising a first sensor signal and a second sensor signal and with the determining the mass flow rate further comprising:
   generating a 90 degree phase shift from the first sensor signal;
   computing a frequency response using the 90 degree phase shift and the first sensor signal;
   computing a phase difference using at least the 90 degree phase shift, the first sensor signal, and the second sensor signal;
   computing a time delay using the frequency response and the phase difference;
   computing the mass flow rate from the time delay;
   determining a substantially instantaneous phase difference;
   dividing the phase difference by the frequency in order to obtain a time delay; and
   multiplying the time delay by a constant in order to obtain the mass flow rate.

28. A method for determining a mass fraction of flow components in a flow material flowing through a flow meter, the method comprising:
   receiving a frequency response of the flow material in a meter electronics of the flow meter;
   the meter electronics filtering the frequency response with a first filter that substantially rejects the gas frequency component and substantially passes the fluid frequency component, wherein the first filter outputs the fluid frequency component;
   the meter electronics filtering the frequency response with a second filter that substantially rejects the fluid frequency component and substantially passes the gas frequency component, wherein the second filter outputs the gas frequency component;
   the meter electronics determining an overall density from the frequency response;
   the meter electronics determining a gas density from the gas frequency component;
   the meter electronics determining the void fraction of gas from the frequency response and one or more of the gas frequency component and the fluid frequency component; and
   the meter electronics determining the mass fraction from the void fraction of gas multiplied by a ratio of the gas density divided by the overall density.

29. The method of claim 28, with the gas density comprising an inverse of the gas frequency squared and with the overall density comprising an inverse of the frequency squared.

30. The method of claim 28, further comprising:
   determining a mass flow rate of the flow material from the frequency response; and
   determining at least one of a first flow component mass and a second flow component mass using the mass fraction and the mass flow rate.

31. The method of claim 30, with the determining the mass flow rate comprising:
   determining a substantially instantaneous frequency; and
   determining a substantially instantaneous phase difference, wherein the mass flow rate is determined using the frequency and the phase difference.

32. The method of claim 30, with the frequency response comprising a first sensor signal and a second sensor signal and with the determining the mass flow rate comprising:
   determining a substantially instantaneous frequency;
   determining a substantially instantaneous phase difference;
   dividing the phase difference by the frequency in order to obtain a time delay; and
   multiplying the time delay by a constant in order to obtain the mass flow rate.

33. The method of claim 30, with the frequency response comprising a first sensor signal and a second sensor signal and with the determining the mass flow rate further comprising:
   generating a first 90 degree phase shift from the first sensor signal;
   computing the frequency using the first 90 degree phase shift and the first sensor signal;
   determining a substantially instantaneous phase difference;
   dividing the phase difference by the frequency in order to obtain a time delay; and
   multiplying the time delay by a constant in order to obtain the mass flow rate.

34. The method of claim 30, with the frequency response comprising a first sensor signal and a second sensor signal and with the determining the mass flow rate further comprising:
   generating a first 90 degree phase shift from the first sensor signal;
   computing the phase difference using the first 90 degree phase shift, the first sensor signal, and the second sensor signal;
   determining a substantially instantaneous phase difference;
   dividing the phase difference by the frequency in order to obtain a time delay; and
   multiplying the time delay by a constant in order to obtain the mass flow rate.

35. The method of claim 30, with the frequency response comprising a first sensor signal and a second sensor signal and with the determining the mass flow rate further comprising:
   generating a first 90 degree phase shift from the first sensor signal;
   generating a second 90 degree phase shift from the second sensor signal;
   computing the phase difference using the first 90 degree phase shift, the second 90 degree phase shift, the first sensor signal, and the second sensor signal;
   determining a substantially instantaneous phase difference;
   dividing the phase difference by the frequency in order to obtain a time delay; and
   multiplying the time delay by a constant in order to obtain the mass flow rate.

36. The method of claim 30, with the frequency response comprising a first sensor signal and a second sensor signal and with the determining the mass flow rate further comprising:

generating a 90 degree phase shift from the first sensor signal;

computing a frequency response using the 90 degree phase shift and the first sensor signal;

computing a phase difference using at least the 90 degree phase shift, the first sensor signal, and the second sensor signal;

computing a time delay using the frequency response and the phase difference;

computing the mass flow rate from the time delay;

determining a substantially instantaneous phase difference;

dividing the phase difference by the frequency in order to obtain a time delay; and multiplying the time delay by a constant in order to obtain the mass flow rate.

* * * * *

UNITED STATES PATENT AND TRADEMARK OFFICE
CERTIFICATE OF CORRECTION

| | | |
|---|---|---|
| PATENT NO. | : 7,805,261 B2 | Page 1 of 1 |
| APPLICATION NO. | : 11/914810 | |
| DATED | : September 28, 2010 | |
| INVENTOR(S) | : Mark James Bell and Craig B McAnally | |

It is certified that error appears in the above-identified patent and that said Letters Patent is hereby corrected as shown below:

Column 25, line 24 replace "farther" with --further--

Signed and Sealed this
Twenty-second Day of March, 2011

David J. Kappos
*Director of the United States Patent and Trademark Office*